(12) United States Patent
Wach et al.

(10) Patent No.: US 8,363,992 B1
(45) Date of Patent: *Jan. 29, 2013

(54) FACILE OPTICAL ASSEMBLIES AND COMPONENTS

(75) Inventors: Michael L. Wach, Alpharetta, GA (US); Dwight Holter, Naples, FL (US)

(73) Assignee: Cirrex Systems LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,351

(22) Filed: Feb. 5, 2012

Related U.S. Application Data

(63) Continuation of application No. 11/980,337, filed on Oct. 30, 2007, now Pat. No. 8,135,250, which is a continuation of application No. 10/429,166, filed on May 2, 2003, now Pat. No. 7,298,936, which is a continuation of application No. 10/010,854, filed on Dec. 4, 2001, now abandoned.

(60) Provisional application No. 60/251,270, filed on Dec. 4, 2000.

(51) Int. Cl.
   *G02B 6/34* (2006.01)
   *C03B 37/018* (2006.01)
   *C03C 25/00* (2006.01)

(52) U.S. Cl. ............. 385/37; 359/566; 359/586; 65/392

(58) Field of Classification Search ............. 385/37, 385/147; 359/566, 589, 900; 65/385, 392
   See application file for complete search history.

(56) References Cited

U.S. PATENT DOCUMENTS

| | | | |
|---|---|---|---|
| 4,484,794 A | 11/1984 | Witte | |
| 4,639,074 A | 1/1987 | Murphy | |
| 4,725,110 A | 2/1988 | Glenn et al. | |
| 5,091,986 A | 2/1992 | Arii et al. | |
| 5,214,730 A | 5/1993 | Nagasawa et al. | |
| 5,235,639 A | 8/1993 | Chevalier et al. | |
| 5,237,630 A | 8/1993 | Hogg et al. | |
| 5,265,177 A | 11/1993 | Cho et al. | |
| 5,343,544 A | 8/1994 | Boyd et al. | |
| 5,351,324 A * | 9/1994 | Forman | 385/37 |
| 5,633,975 A | 5/1997 | Gary et al. | |
| 5,838,853 A | 11/1998 | Jinnai et al. | |
| 5,953,477 A | 9/1999 | Wach et al. | |
| 6,208,783 B1 | 3/2001 | Wach | |
| 6,222,970 B1 | 4/2001 | Wach et al. | |
| 6,404,953 B1 | 6/2002 | Wach et al. | |
| 6,467,969 B1 | 10/2002 | Shmulovich | |
| 6,542,660 B1 | 4/2003 | Medin et al. | |
| 6,542,673 B1 | 4/2003 | Holter et al. | |

(Continued)

FOREIGN PATENT DOCUMENTS

JP    05313039 A    11/1993

OTHER PUBLICATIONS

Notice of Allowance dated Jun. 29, 2007 in U.S. Appl. No. 10/429,166.

(Continued)

*Primary Examiner* — Daniel Petkovsek
(74) *Attorney, Agent, or Firm* — Hope Baldauff Hartman, LLC

(57) ABSTRACT

A micro identification system supports facile optical assemblies and components. A segment of optical fiber can comprise an identifier formed via actinic radiation. The identifier can generate a laser interference pattern that can be read through a cylindrical surface of the optical fiber to determine a code. Modified optical fibers are those fibers that have been shaped or coated to an extent beyond the demands of normal communications optical fibers. In one example, modified fibers are no longer than about two feet in length. For another example, the modified fibers can have either a non-cylindrical end face, a non flat end face, an end face the plane of which is not perpendicular to the longitudinal axis of the waveguide, an end face coated with high density filter, or an identifier on or near an end face.

3 Claims, 23 Drawing Sheets

U.S. PATENT DOCUMENTS

| | | |
|---|---|---|
| 6,728,444 B2 | 4/2004 | Brennan et al. |
| 7,298,936 B1 | 11/2007 | Wach et al. |
| 2002/0126953 A1 | 9/2002 | Wach |
| 2004/0052460 A1 | 3/2004 | Wach |

OTHER PUBLICATIONS

Official Action dated Aug. 25, 2010 in U.S. Appl. No. 11/980,337.

Official Action dated Mar. 10, 2011 in U.S. Appl. No. 11/980,337.

Notice of Allowance dated Nov. 7, 2011 in U.S. Appl. No. 11/980,337.

U.S. Appl. No. 60/213,983, entitled "Micro Identifier System and Components for Optical Assemblies", filed Jun. 24, 2000, Inventors: Dwight Holter and Michael Wach.

U.S. Appl. No. 60/038,395, entitled "Improved Filtering of Optical Fibers and Other Related Devices", filed Feb. 14, 1997, Inventor: Michael Wach.

* cited by examiner

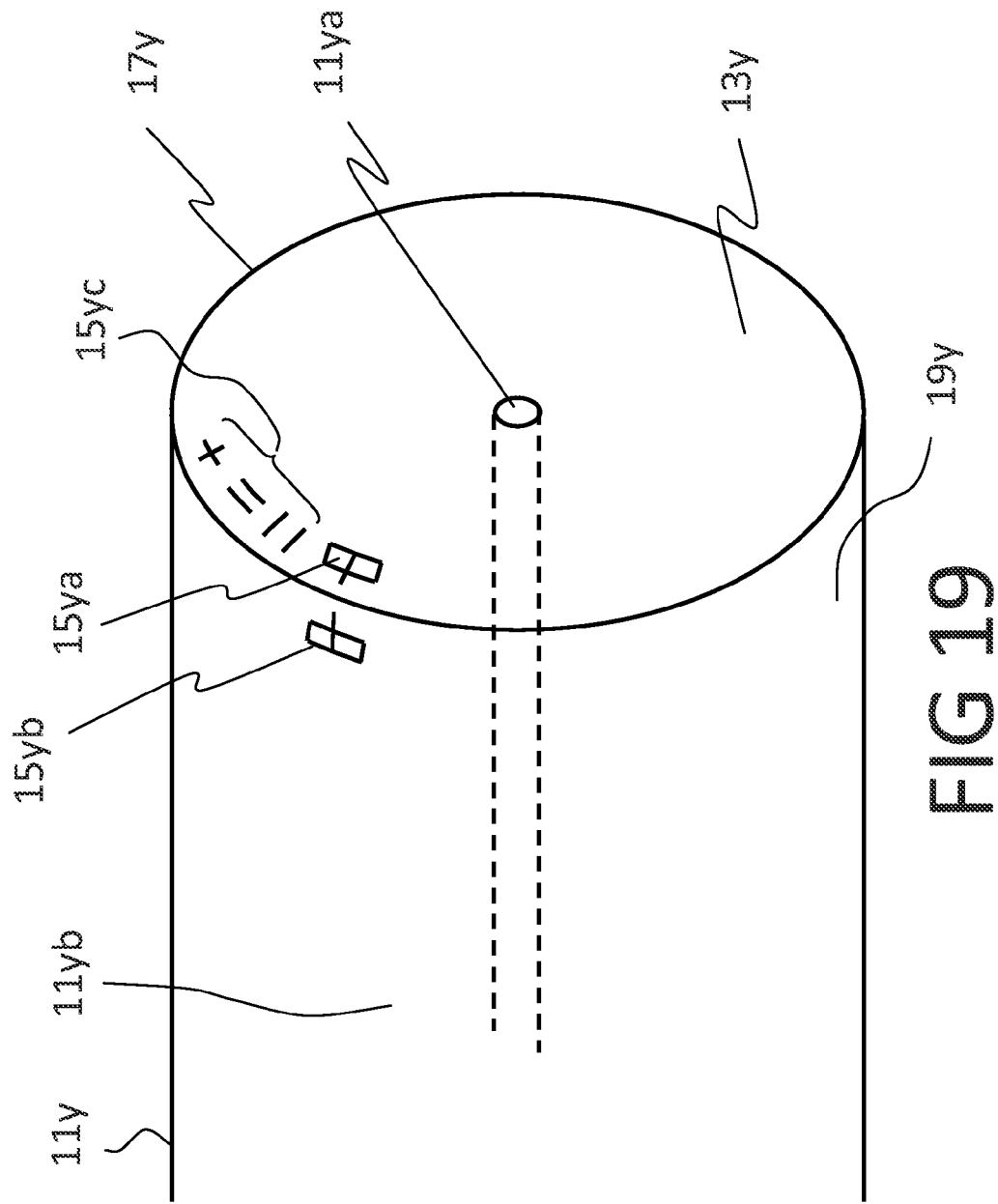

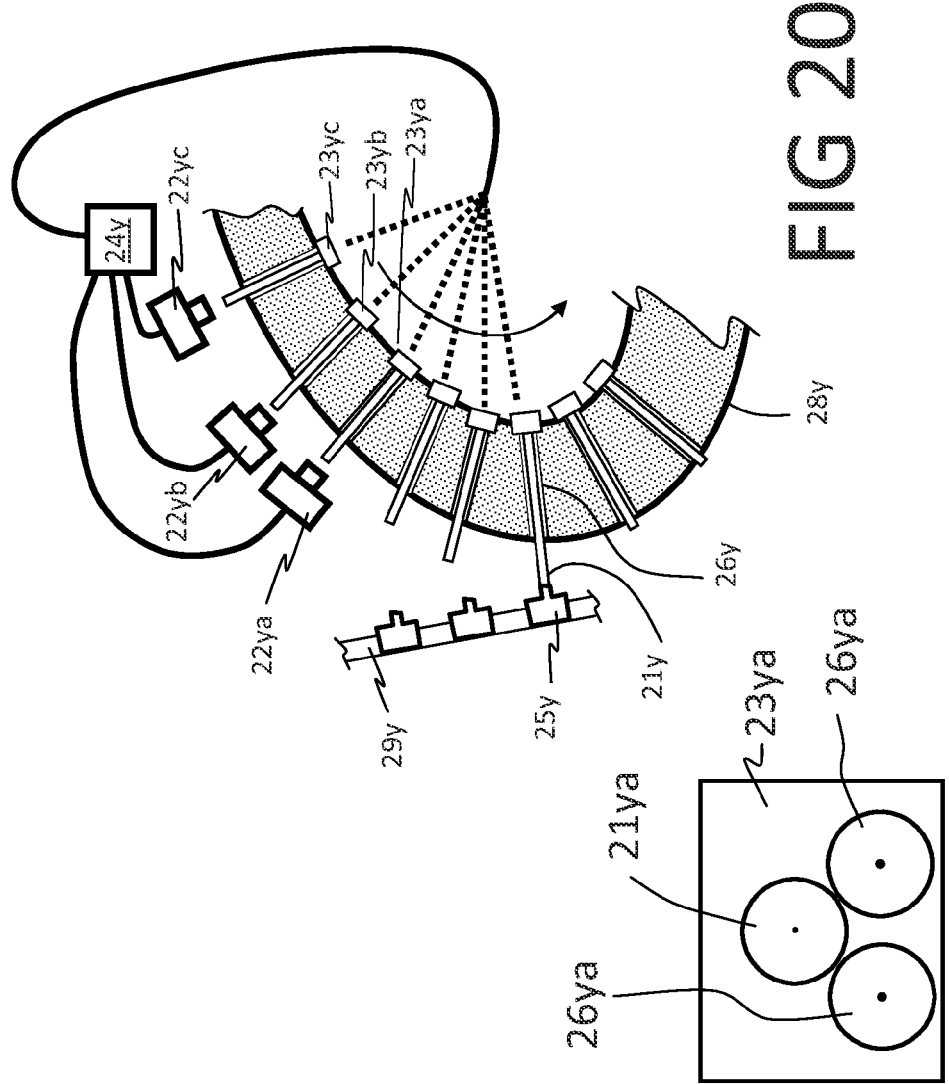

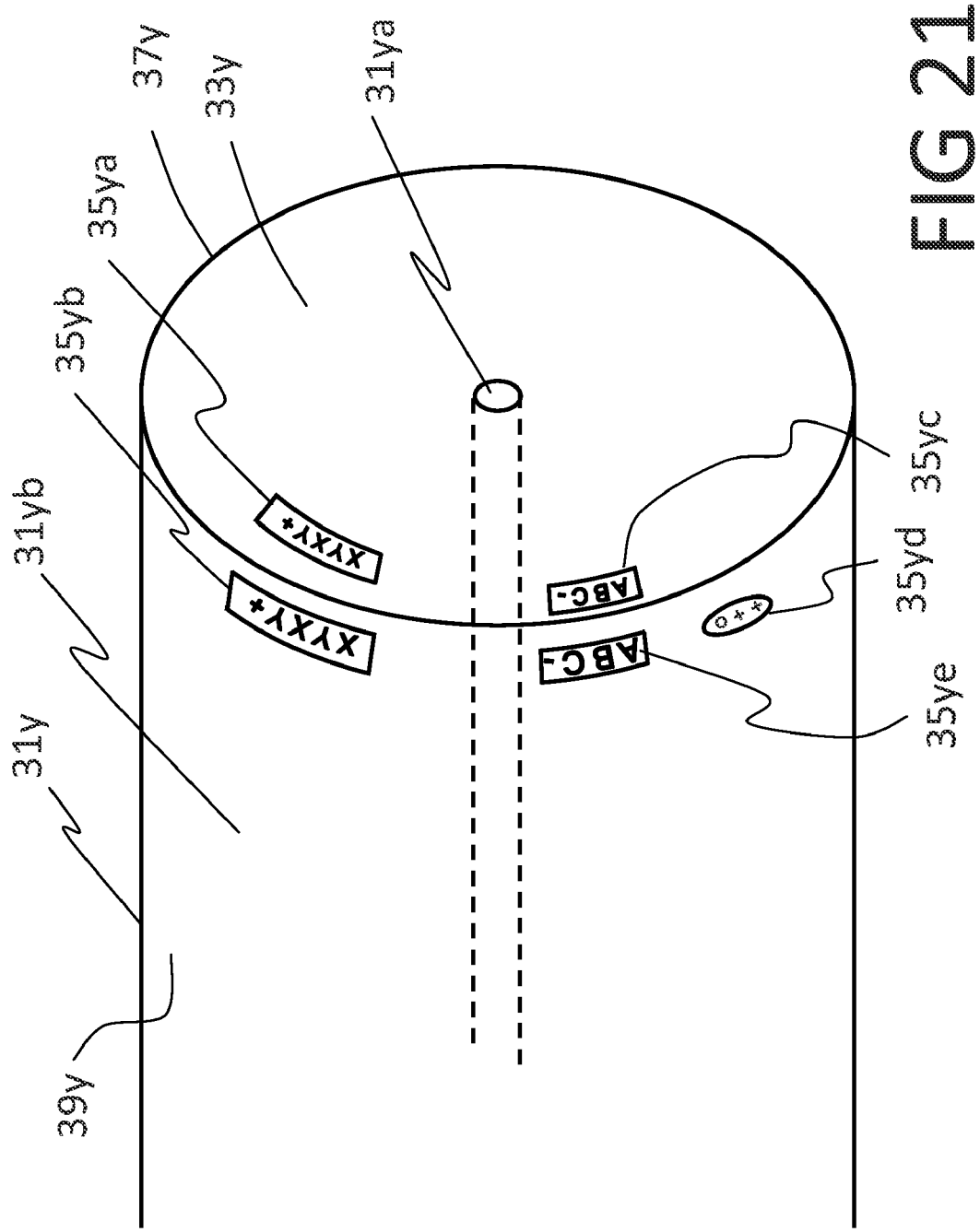

FACILE OPTICAL ASSEMBLIES AND COMPONENTS

CROSS REFERENCE TO RELATED APPLICATIONS

The present application is a continuation of and claims priority to U.S. Non-Provisional patent application Ser. No. 11/980,337, entitled "Facile Optical Assemblies and Components" and filed Oct. 30, 2007 in the name of Wach et al., now U.S. Pat. No. 8,135,250, which is a continuation of and claims priority to U.S. Non-Provisional patent application Ser. No. 10/429,166, entitled "Facile Production of Optical Communication Assemblies and Components" and filed on May 2, 2003 in the name of Wach et al., now U.S. Pat. No. 7,298,936, which is a continuation of and claims priority to U.S. Non-Provisional patent application Ser. No. 10/010,854, entitled "Facile Production of Optical Communication Assemblies and Components" and filed on Dec. 4, 2001 in the name of Wach et al., now abandoned which claims priority under 35 U.S.C. 119 to the filing date of Dec. 4, 2000 accorded to the U.S. Provisional Patent Application Ser. No. 60/251,270. The entire contents of U.S. Non-Provisional patent application Ser. No. 11/980,337; U.S. Non-Provisional patent application Ser. No. 10/429,166; and U.S. Non-Provisional patent application Ser. No. 10/010,854 are hereby incorporated herein by reference.

BACKGROUND OF THE INVENTION

Fiber to fiber and fiber to waveguide linking devices that have been described in the art tend to focus on a substantial length of fiber placed for linkage to another fiber or to a planar waveguide. Prior art connectors and splicing devices typically do not meet the increased demand for minimizing on-line manufacturing time or part replacement/repair time to meet the overall cost requirements for optical communications equipment, particularly in high volume production operations. With the tremendous need for increasing bandwidth, a need exists in the art for increased precision in such linkages and for modifying or eliminating rate-limiting steps in component manufacturing. The increase in overall demand for high quality optical components at modest cost has intensified the importance of achieving high quality consistently and efficiently.

Fiber modification techniques disclosed in U.S. Pat. No. 5,953,477, entitled "Method and Apparatus for Improved Fiber Optic Light Management," filed Mar. 13, 1997, address these challenges. However, the increased capability of separating wavelengths made possible by these advances has further increased the need for precision in other aspects of manufacturing optical assemblies. Cirrex U.S. patent application Ser. No. 09/318,451, entitled, "Optical Assembly with High Performance Filter," filed May 25, 1999, (incorporated herein by reference in its entirety), which has now issued as U.S. Pat. No. 6,404,953, describes various modifications to fibers. Content of U.S. patent application Ser. No. 09/318,451 has been inserted below under the heading "From U.S. patent application Ser. No. 09/318,451 Entitled "Optical Assembly with High Performance Filter"" with FIGS. 1, 2, 3, 4, 5, 6 7, 8, 9, 10, 11a, and 11b respectively renumbered as FIGS. 8, 9, 10, 11, 12, 13, 14, 15, 16, 17, 18a, and 18b and the letter "x" appended to the figure reference numbers to avoid confusion with other disclosed figures and figure reference numbers. Cirrex U.S. Patent Application Ser. No. 60/213,983 entitled, "Micro Identifier System and Components for Optical Assemblies," filed Jun. 24, 2000 (also incorporated herein by reference in its entirety) describes a system having an identifying mechanism for high performance waveguides that is machine-readable (especially, by optical means, for example, using a laser interference pattern) for quick and accurate recall of information included in the identifying mechanism. Content of U.S. Patent Application Ser. No. 60/213,983 has been inserted below under the heading "From U.S. Patent Application No. 60/213,983 Entitled "Micro Identifier System and Components for Optical Assemblies" with FIGS. 1, 2, 2a, 3, 4, and 5 respectively renumbered as FIGS. 19, 20, 20a, 21, 22, and 23 and the letter "y" appended to the figure reference numbers to avoid confusion with other disclosed figures and figure reference numbers. Many of the individual components of such optical assemblies are extremely small and technically complex. Differences between component assembly pieces or even differences within individual pieces are difficult to discern. The '983 patent application describes how etching or engraving, for example, of a cladding surface can provide precise and detailed product information, including: the manufacturer, the core and cladding dimensions, compositions, indices of refraction, and other imprinting. Internal identifiers of that type can also be utilized for system integrity/uniformity checks for quality assurance.

Additional details may be important for other types of optical fibers. For example, the end face of one fiber may be intentionally angled so that its face is not uniformly perpendicular to its axis and the axis of a waveguide with which it is to be mated. (See Cirrex U.S. patent application Ser. No. 09/578,777, entitled, "Method and System for Increasing a Number of Information Channels Carried by Optical Waveguides," which is incorporated herein in its entirety by reference and which has now issued as U.S. Pat. No. 6,542,660.) For a very slight angle, it may be critical to have the end face precisely oriented as it mates with the waveguide. The extent to which the fiber core is off-center or elliptical may also be included in the identifier. The identifier on the fiber and the waveguide provides sufficient information for the mating to be precise.

One advantage of using the peripheral surface of a fiber end face for the identifier is relative space availability. The entire periphery of the end face could be utilized if information space and image clarity are required. Similarly, the probability of that area causing fiber function limitations is low and could be reduced further, for example, by covering disrupted (etched/engraved) surface areas with material that would restore transparency to wavelengths negatively affected without detrimentally affecting the readability of the image. Such factors play a role in determining which identifier process, marking and location to utilize. It also may be critical to high volume production for the information to be read significantly in advance of the mating operation and in some cases even by a different manufacturer. Each improvement in one area exposes additional challenges for the manufacturing processes in other areas, for example, in assuring appropriate, precise fiber to fiber, or fiber to waveguide mating.

SUMMARY

In accordance with the present invention, a modified fiber interlink, typically an optical assembly multi-channel subcomponent, can be created to form the optical link between multiple channel waveguides to be mated. For example, modified fiber interlinks form optical paths between multiple fibers and a multi-channel planar waveguide. Modified optical fibers are those that have been shaped or coated to an extent beyond the demands of normal communications optical fibers. In one example, modified fibers are no longer than about two feet in length and can have either a non-cylindrical end face, a non-flat end face, an end face the plane of which is not perpendicular to the longitudinal axis of the waveguide, an end face coated with high density filter, or an identifier on or near an end face. In another example, the modified fiber can include at least one high density filter in the interlink within an interlink channel.

Modified fiber interlinks can be manufactured in a separate operation and thus taken off-line from the main optical assembly manufacturing line. These integral interlinks, in which fibers have been shaped so precisely and/or coated with special filters, can be included in optical assemblies to ultimately provide their beneficial functions without slowing the entire assembly operation. This off-line production can result in a subcomponent that minimizes linkage time in the full component assembly operation. The subcomponent also can decrease the potential for defective linkages or less than optimal performance in both the subcomponent manufacturing operation and the assembly operation.

BRIEF DESCRIPTION OF THE DRAWINGS

FIG. 19, from U.S. Patent Application No. 60/213,983, illustrates several embodiments of an identifier means.

FIG. 20, from U.S. Patent Application No. 60/213,983, shows in perspective view a system that includes a reading means for sufficient identification to initiate appropriate reaction.

FIG. 20a, from U.S. Patent Application No. 60/213,983, illustrates in end view cutaway a drive having rollers supporting a fiber segment.

FIG. 21, from U.S. Patent Application No. 60/213,983, illustrates in perspective view several options for placement or configuration of identifier spaces.

DETAILED DESCRIPTION OF THE EXEMPLARY EMBODIMENTS

Figure 1:
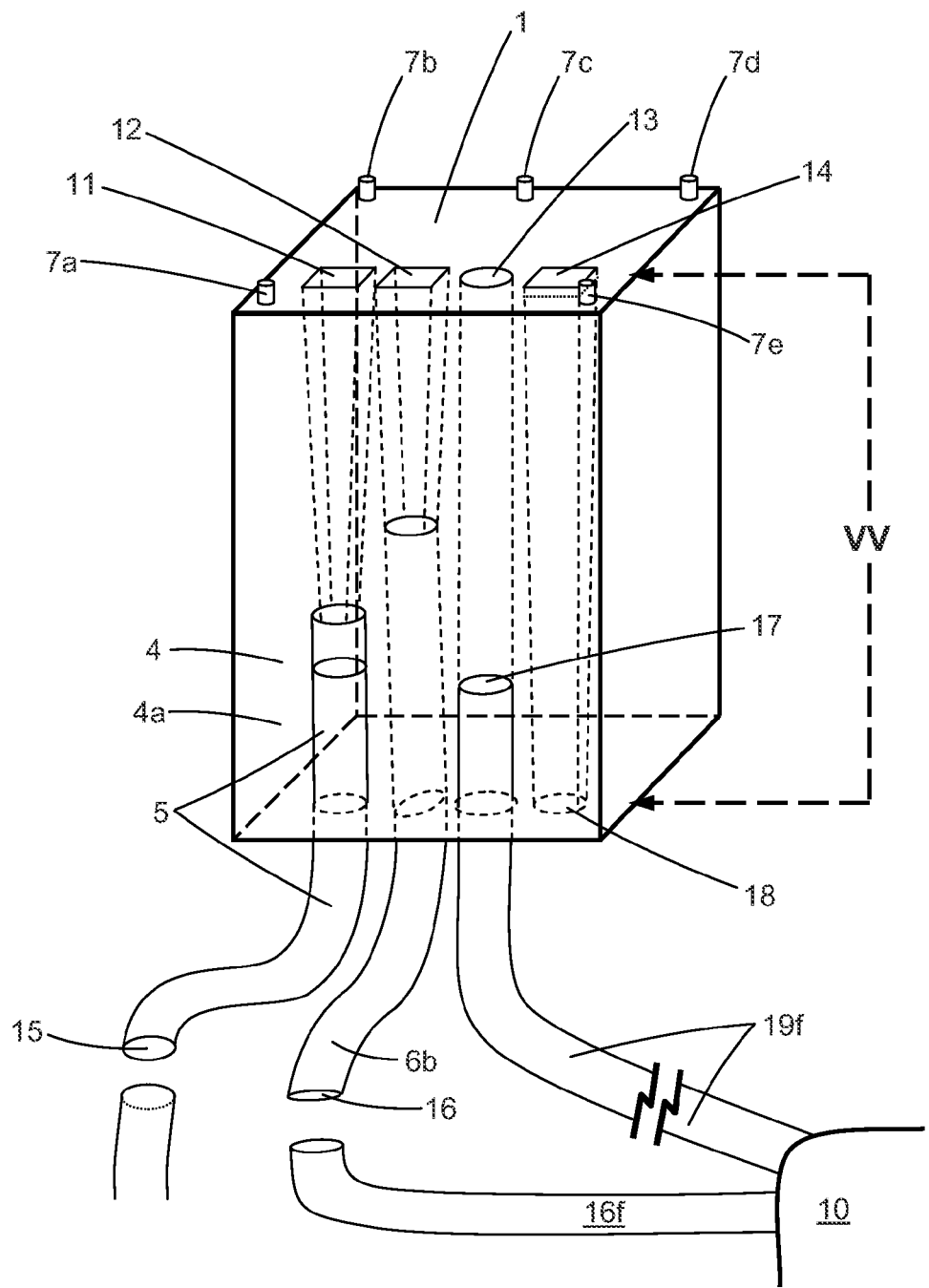
FIG. 1 depicts in exaggerated perspective an interlink having four differently configured waveguides in accordance with an exemplary embodiment of the present invention.
Figure 2:
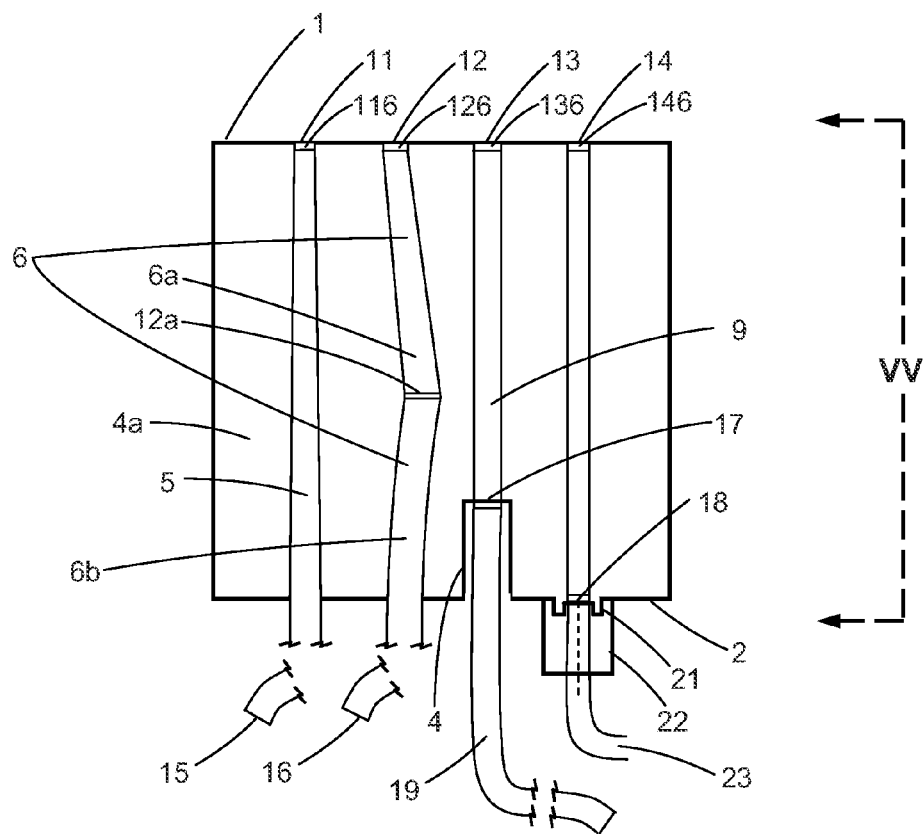
FIG. 2 shows the exemplary interlink of FIG. 1 in cutaway along the AA plane.
Figure 7:
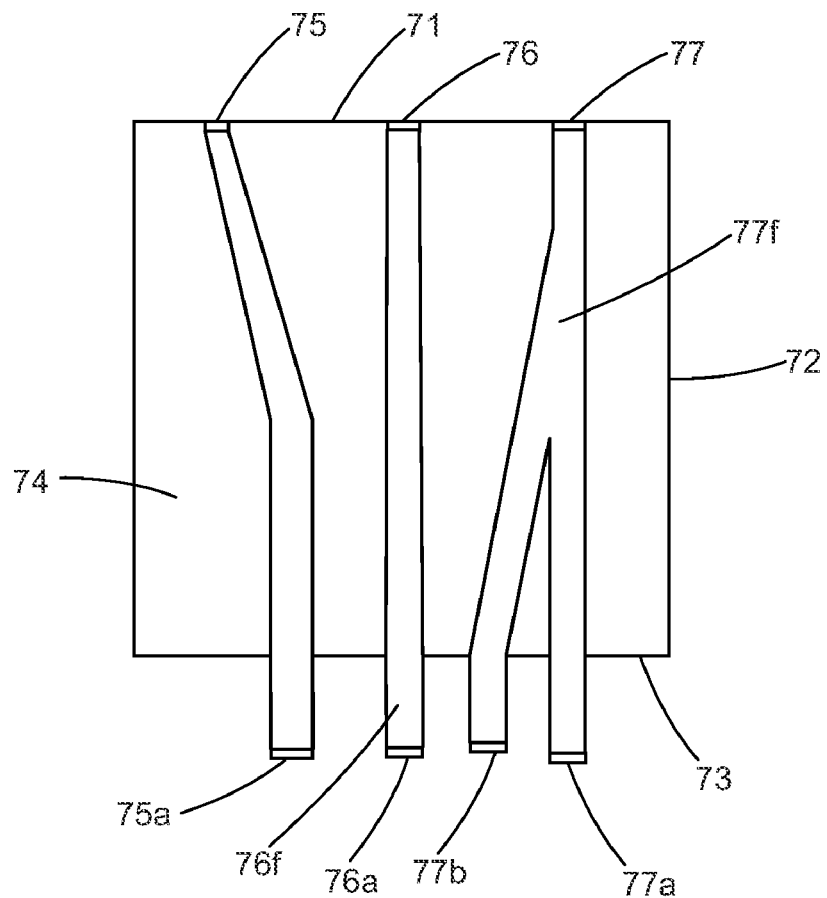
FIG. 7 illustrates in cutaway additional configurations of waveguides in interlink applications in accordance with an exemplary embodiment of the present invention.

As shown by the exemplary embodiment in FIG. 1, interlink 4 links by providing optical channels, waveguides 5, 6 (an optical fiber formed by fusing fiber segment 6a to fiber segment 6b forming junction 12a) 8, and 9, between a planar waveguide (see planar waveguide unit 30 in FIG. 3) and at least one optical fiber system 10 of which optical fiber 19f is a part. Optical fiber 19f can be mated to waveguide 9, preferably an optical fiber, at interface 17, by inserting fiber 19f in channel or recess 4c of block 4a (See FIG. 2 for additional detail). For example, by using an appropriate epoxy, fiber 19f can be fused to fiber 9 with a filter disposed at the interface 17 therebetween. Optical fiber 18f can be mated to waveguide 8 at interface 18 by inserting fiber 18f into a locking mechanism 22 such as an optical seal housing. The locking mechanism 22 is coupled to face 2 of the interlink 4 by flanges 21 that engage the locking mechanism 22. Disposed at interface 18 can be a filter. Overall, waveguides 5, 6, 8, and 9 of interlink 4 demonstrate various types of optical connections that can exist within interlink 4. It will be understood that the present invention is not limited to the number and types of waveguides shown within interlink 4. For example, FIG. 7 illustrates yet another exemplary embodiment of the type of waveguide, configuration that can be disposed within an interlink 4.

Block 4a is rigid, constructed of material opaque to the wavelengths of light expected to be transmitted through the embedded waveguides and light to which the unit is exposed. The material is preferably a plastic that is resistant to thermal expansion and is thermally stable. Fibers 15f, 16f, 18f of the optical fiber system can mate with waveguide ends 15, 16, and 18 respectively of interlink 4. Multi-channel planar optical waveguide unit 30 (see FIG. 3) has a docking surface 39 and ports 31, 32, 33' and 34 optically open to waveguide channels of planar optical waveguide unit 30 which ultimately communicate with waveguides 35a, 35b, 35c and 35d. Face surface region 1 of interlink 4 (FIG. 1) and its positioning pins 7a, 7b, 7c, 7d and 7e mate with docking surface 39 (FIG. 3) and its pin receptacles 37a, 37b, 37c, 37d, and 37e, respectively. Ports 11, 12, 13 and 14 of interlink 4 (FIG. 1) mate precisely with ports 31, 32, 33 and 34 respectively (FIG. 3) of planar optical waveguide unit 30. Secure mating for each of the respective waveguide ends can be accomplished by using an appropriate epoxy or other material (e.g. index matching gel) to assure transparent connection. For less than permanent connection, the mating could also be secured by using an index matching gel and a connection system that securely but releasably connects (e.g. using latches) interlink 4 face surface 1 with the docking surface 39 of planar waveguide unit 30. Another alternative that could be used in lieu of or with placement pins and receptacles is a male/female grooving system, as shown in exaggerated perspective in FIG. 3b.

Figure 3:
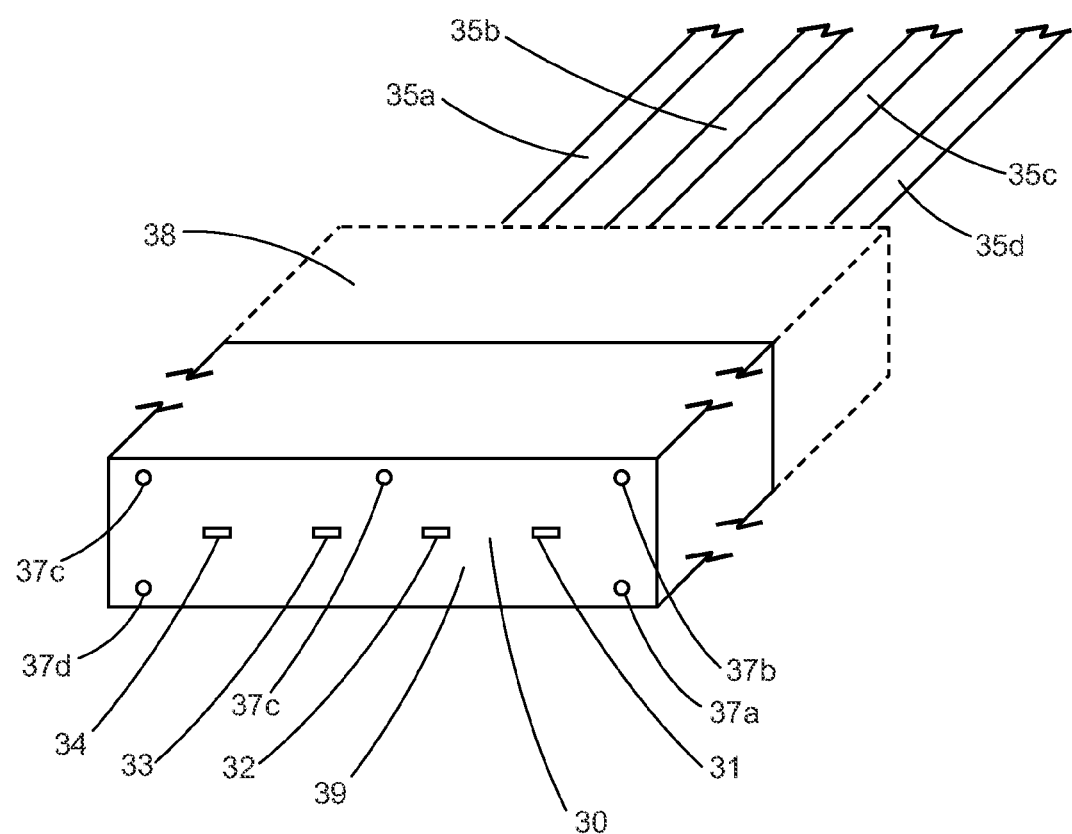
FIG. 3 depicts in exaggerated perspective a planar waveguide configured for mating with the exemplary interlink of FIG. 1.
Figure 3A:
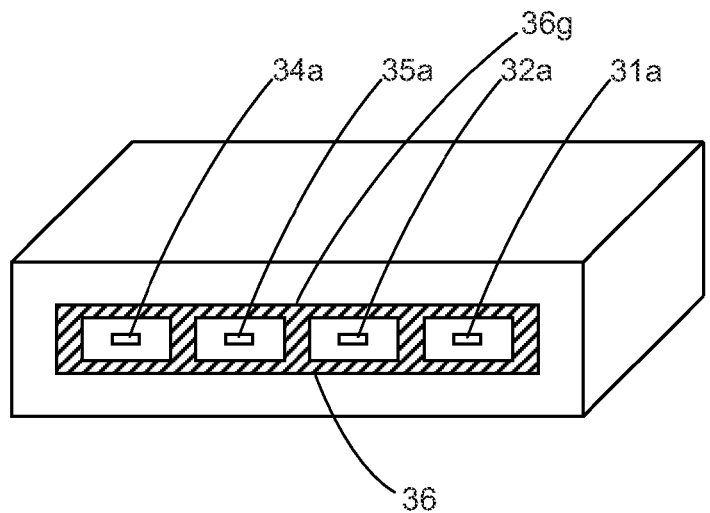
FIG. 3a illustrates in exaggerated perspective a planar waveguide face having a groove surrounding each port for mating with a mating projection surrounding each mating port on a modified fiber interlink in accordance with an exemplary embodiment of the present invention.
Figure 3B:
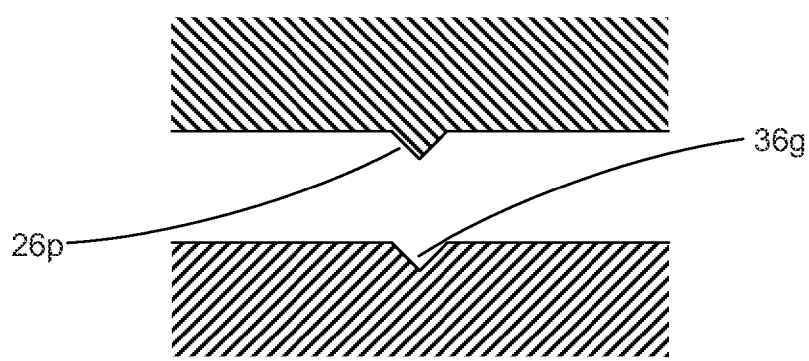
FIG. 3b illustrates a mating projection and a groove for a planar waveguide interlink interface in accordance with an exemplary embodiment of the present invention.

FIG. 3a shows a multi-channel planar waveguide face (docking surface) 36 having groove 36g spaced and completely but separately surrounding each of the ports, 31a, 32a, 33a and 34a. A mating modified fiber interlink would include a precisely dimensioned face surface having shaped, continuous projections 26p that would mate with groove 36g, as illustrated in FIG. 3b. The interlink would also include ports that would mate precisely with ports 31a, 32a, 33a and 34a. As best shown in FIG. 3b, mating projection 26p mates exactly with groove 36g, but the projection could be modified to guide itself to the full depth of groove 36g. The advantage of a grooving system is that it helps to assure no unintended photon transfer between non mated ports.

In FIG. 1, modified fiber interlink 4 includes optical waveguides of four different configurations for purposes of illustrating the versatility of applicant's invention. Waveguide 5 is a single mode optical fiber which between face 1 and face 2 of unit 4 is embedded in solid opaque block 4a. A significant portion of optical fiber 5 protrudes from face 2 for linking, desirably by fusion at end 15 to a matching optical fiber 15f of optical fiber system 10. The embedded part of optical fiber 5 has an axial cross section that has been modified to transition from a circular cross section at distal end 15 and extending beyond face 2 into block 4a to a rectangular cross section at the proximal end of fiber 5 at port 11. Each of the transitional optical waveguides 5, 6, 9 and 8 has a proximal end at least near face surface region 1. In an exemplary embodiment of this invention, waveguides 5, 6, 8, 9 of interlink 4 are each a separate optical fiber, with at least one having on its proximal end an integral high density filter. In another exemplary embodiment, each separate fiber 5, 6, 8 and 9 has a distal end and at least one has a high density filter on its distal end. Such filters are described in detail in U.S. Pat. No. 5,953,477 mentioned above. Optical fibers 5 and 6 of interlink 4 protrude from face surface region 2 and each has a distal end, 15 and 16, respectively, exterior to block 4a. The longitudinal axis of optical fiber 6 is positioned obliquely to face surface region 1. However, high density filter 12b on the proximal end of fiber 6 (shown more clearly in FIG. 2) is preferably parallel to an optical fiber face surface 1 because of the end shaping on both ends of fiber segment 6a and on the juncture end 12a of 6b. It is this sort of precision and flexibility in fusing that highlights the advantages of the interlinks of the exemplary embodiments of the present invention. In another exemplary embodiment, the waveguides of interlink 4 are optical fibers with the proximal end of the fibers 5 (at port 11), 6 (at port 12), 9 (at port 13) and 8 (at port 14) each being slightly recessed from face surface 1. This allows for an appropriate amount of epoxy or other optically transparent material for fusing the fiber ends, for example, to selected waveguide channels in planar waveguide unit 30.

Figure 4:
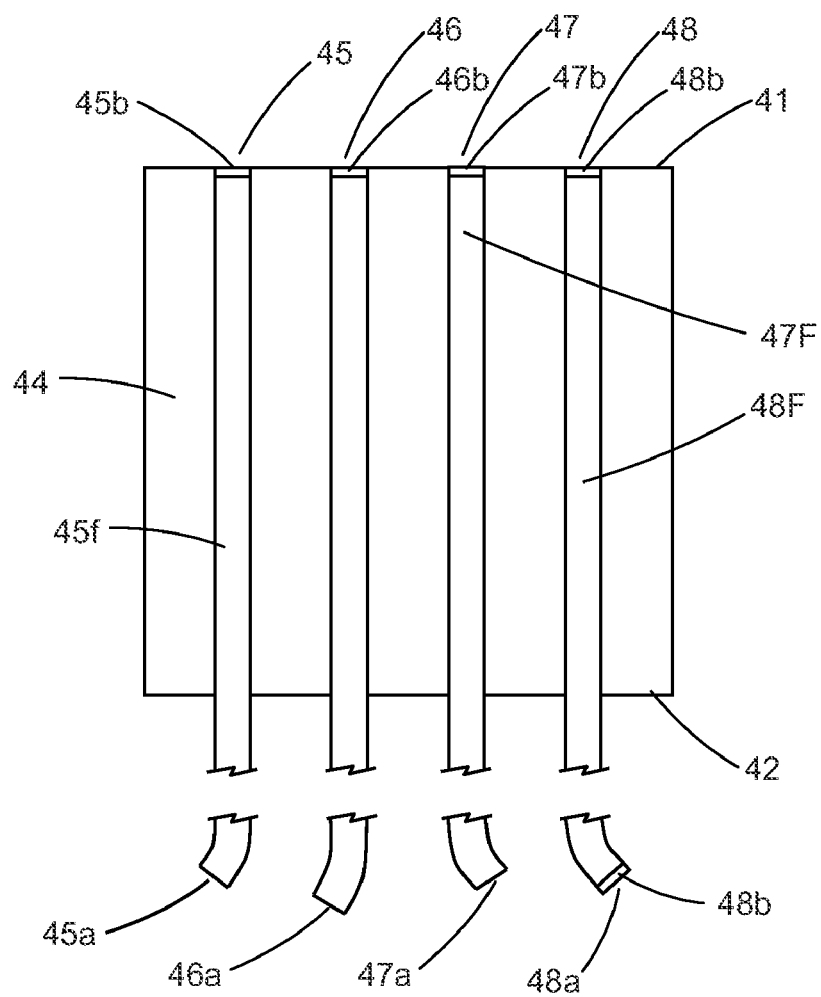
FIG. 4 depicts in cutaway an interlink with cylindrical fibers with high density filters on fiber ends in accordance with an exemplary embodiment of the present invention.

FIG. 4 illustrates a cross-sectional view of an interlink comprising cylindrical fibers with high density filters on fiber ends in accordance with an exemplary embodiment of the invention. Referring now to FIG. 4, an interlink 41 comprises a block 44 and cylindrical fibers 45f, 46f, 47f, and 48f. The block 44 is preferably constructed of a rigid material opaque to the wavelengths of light expected to be transmitted through an embedded portion of the optical fibers 45f, 46f, 47f, and 48f and light to which the unit is exposed. The optical fibers 45f, 46f, 47f, and 48f provide optical channels or waveguides for carrying optical signals. Along face surface 41 of the block 44, the optical fibers 45f, 46f, 47f, and 48f comprise ports 45, 46, 47, and 48, respectively. Filters 45b, 46b, 47b, and 48b, typically high density filters, are positioned along each proximal end face of the optical fibers 45f, 46f, 47f, and 48f, respectively, at the ports 45, 46, 47, and 48 along the face 41. Distal ends 45a, 46a, 47a, and 48a of the optical fibers 45f, 46f, 47f, and 48f, respectively, protrude from a face surface 42 of the interlink 44. One or more of the distal ends 45a, 46a, 47a, and 48a can include an optical filter, such as a high density filter 48a positioned at the distal end 48b. At the face surface 42, a significant portion of each optical fiber 45, 46, 47, and 48 protrudes from the block 44 for linking, preferably by fusion to another optical fiber.

Figure 5:
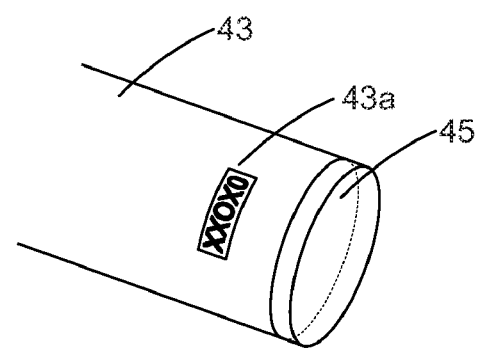
FIG. 5 illustrates a fiber of FIG. 4 having an identifier embedded thereon in accordance with an exemplary embodiment of the present invention.

FIG. 5 illustrates a fiber of FIG. 4 having an identifier embedded adjacent to one end of the fiber in accordance with an exemplary embodiment of the present invention. As shown in FIG. 5, the optical fiber 45 can comprise an outside surface 43 including an identifier 43a. The identifier 43a is conveniently located proximate to an end of the optical fiber 45 where it can remain visible during operation of the interlink 44. The identifier 43a typically provides identification information to facilitate mating of the optical fiber 45 with another optical fiber or waveguide structure. The identifier 43a preferably includes sufficient space for the incorporation of a micro bar code, magnetic identifier or other identification information. To assist in appropriate alignment in mating of optical assemblies, the identifier 43a can identify the dimensions and characteristics of the optical fiber 45. In addition, the core and polarization axes can be identified with respect to the location of the identifier 43a. In the alternative, testing and alignment information can be provided by the identifier 43a to support alignment and testing operations. It will be appreciated that the identifier 43a can be positioned at other locations along the optical fiber 45 so long as the identifier is visible to a user during operations of the interlink 44.

Figure 6:
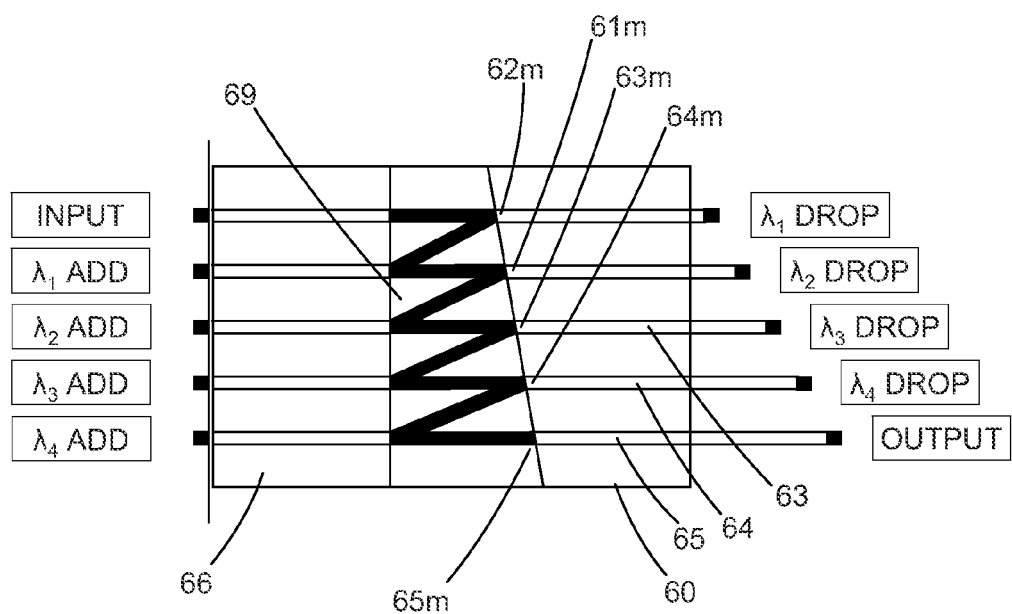
FIG. 6 illustrates in schematic two interlinks used in an add-drop multiplexer application in accordance with an exemplary embodiment of the present invention.

In FIG. 6, a fiber interlink 60 has tapered (oblique) proximal end faces on each of fibers 61, 62, 63, 64 and 65, which mate respectively with mating, tapered ports 61m, 62m, 63m, 64m and 65m of a planar waveguide 69. Similarly, a fiber interlink 66 comprises proximal end faces on optical fibers that mate with opposing ports of the planar waveguide 69. The interlinks 60 and 66 operate in connection with the planar waveguide 69 to support an add-drop multiplexer application for adding and dropping optical signals of various wavelengths. The interlink 60 supports the drop function, whereas the interlink 66 supports the add function.

For example, an optical signal input at an input port of the interlink 66 is passed by an optical fiber to the planar waveguide 69. A filter at the port 62m passes wavelength 1 of the optical signal to the interlink 60 and the remaining wavelengths of the optical signal are reflected at the port 62m. In turn, the fiber 61 carries the optical signal having the wavelength 1 through the interlink 60 to the drop application. Similarly, the filter at the port 61m passes wavelength 2 to the optical fiber 62 of the interlink 60 and reflects the remaining wavelengths of the optical signal. In view of the cascading nature of the planar waveguide 69, similar drop functions are completed at the ports 63m, 64m, and 65m to complete the processing of the optical signal the by the add-drop multiplexer.

FIG. 7 illustrates a cross-sectional view of waveguides in an interlink in accordance with an exemplary embodiment of a present invention. An interlink 72 comprises waveguides 75f, 76f, and 77f constructed from optical fibers of different configurations to provide channels for carrying optical signals. A portion of the optical fibers or waveguides 75f, 76f, and 77f are embedded within an opaque block 74 comprising material opaque to the wavelengths of light expected to be transmitted through the embedded waveguides and light to which the interlink is exposed. Ports 75, 76, and 77 of the optical fibers 75f, 76f, and 77f are positioned along a face surface 71 of the block 74. As discussed in connection with prior embodiments, the ports 75, 76, and 77 typically represent the proximal ends of the optical fibers 75f, 76f, and 77f. Optical filters can be attached to the proximal ends of the optical fibers 75f, 76f, and 77f and adjacent to the ports 75, 76, and 77. The un-embedded portion of the optical fibers 75f, 76f, and 77f extend from a face surface 73 of the block 74. The distal end of each unembedded portion of the optical fibers 75f, 76f, and 77f can include an optical filter such as optical filters 75a, 76a, 77a, and 77b.

In summary, an exemplary embodiment of the present invention provides a modified fiber interlink for linking to and providing optical channels between at least one optical fiber system and at least one multi-channel planar optical waveguide. The waveguide includes a docking surface and ports optically opening on the docking surface to at least some of the optical channels. The interlink has a first face surface for matching the docking surface and selected ports of the planar optical waveguide. This first face surface is configured for mating with the planar optical waveguide and the separate ports thereof and is positioned for optical matching with the selected waveguide ports. The interlink can further include a second face surface positioned in a plane at least approximately parallel to the first face surface. In the alternative, the second face surface can be positioned in a plane oblique to the first face surface.

The interlink can further include at least two modified optical fibers, each having a first fiber end that terminates near the first face surface and is positioned at a different port of the waveguide docking surface. An interlink fiber can be positioned so that it is set at an oblique angle to the first face surface region. An interlink fiber can be shaped to transition the interlink optical channel between a longitudinal length having a larger cross-sectional dimension and a longitudinal length having a smaller cross-sectional dimension. In the alternative, an interlink fiber can be shaped to transition the interlink optical channel between a generally circular cross-section and a rectangular cross-section. One or more of the interlink fibers can be implemented by a shaped optical fiber or by an integral high density filter. This integral high density filter can be positioned at one end of the interlink fiber, typically near the first face surface region.

An interlink fiber can be entirely embedded in fixed position in a rigid opaque material with only its ends exposed, as ports, one of which is for optically mating with an optical fiber from an optical fiber system. In the alternative, an interlink fiber can be partially embedded at one end near the first face surface region in an opaque material with the embedded end exposed as a port for mating with a port in the planar optical waveguide. At least one of the waveguides can include an integral high density filter positioned at one end of the waveguide.

For an alternative embodiment, a modified fiber interlink can link to and provide optical channels between at least one optical fiber system and at least one multi-channel planar optical waveguide having at least one docking surface and ports optically opening on the docking surface to at least some of the optical channels. The interlink comprises a first face surface for matching the docking surface and selected ports of the planar optical waveguide and at least two transitional optical waveguides. Each of the transitional optical waveguides can comprise at least a first transitional optical waveguide end that terminates near the first face surface and is positioned at a separate port in the first face surface.

For yet another exemplary embodiment, an optical subassembly comprises a multi-channel optical planar waveguide having at least a first docking surface and a second docking surface. Each surface comprises ports optically opening to waveguide channels. The optical subassembly further comprises two modified fiber interlinks. A modified interlink typically comprises a first surface with ports mating with the first docking surface and ports therein and a second surface with ports mating with the second docking surface. The modified fiber interlinks can be placed in fixed relationship to the multi-channel planar optical waveguide.

In view of the foregoing, it will be appreciated that an embodiment of the present invention can provide an optical sub-assembly including at least one multi-channel planar waveguide and at least one modified fiber interlink. An exemplary optical sub-assembly can include (1) a multi-channel planar waveguide having two or more ports to at least two channels, and (2) at least two modified fiber interlinks, each having at least a pair of optical fibers with ports for mating with channels in the planar waveguide. Selected channels of the multi-channel planar waveguide can form communication channels between two modified fiber interlinks.

An exemplary embodiment of the present invention can address the need for precise manufacturing processes. In addition, an exemplary embodiment also can open the door for incorporating improvements and features in conjunction with waveguide-to-waveguide junctures. An exemplary modified fiber interlink system can capture the advantages of fiber shape modifications and new filter technologies without slowing the manufacturing process of components and communications systems benefiting from such advances. The exemplary modified fiber interlink system can be incorporated as a part of high volume manufacturing operations.

From U.S. patent application Ser. No. 09/318,451
Entitled "Optical Assembly with High Performance Filter"

From Section of U.S. patent application Ser. No. 09/318,451 Captioned "Abstract"

Optical assembly for controlling or limiting undesirable photon entrance, reflection, departure, or appearance. A material opaque to unwanted photons can be applied to an optical assembly that would otherwise allow penetration of the unwanted photons. For example, a filter can be applied to a waveguide member. A first face surface of the filter faces toward an end of the waveguide member and a second face surface of the filter faces away from that member end. A mask adheres to one of the filter surfaces. The mask is substantially opaque in at least some selected spectral region to impact the extent to which photons in that spectral region can pass through the filter and to the waveguide member.

From Section of U.S. patent application Ser. No. 09/318,451 Captioned "Technical Field"

This invention relates generally to optical assemblies, and more particularly to assemblies including waveguides, for example optical fibers, in optical connection with high performance filters.

From Section of U.S. patent application Ser. No. 09/318,451 Captioned "Background of the Invention"

Optical assemblies including waveguides in recent years have been recognized as offering a high potential for solving problems in a number of commercial applications including telecommunications and medical diagnostics. Optical fiber assemblies are well known in telecommunications and have been found to be especially useful in analyzing materials by employing various types of light-scattering spectroscopy. Optical filters have been found to be useful in such applications. In telecommunications typical uses include bandpass filters in wavelength-division multiplexing and as noise blocking filters for optical amplifiers.

The term "waveguide" is used herein to refer to an optical structure having the ability to transmit light in a bound propagation mode along a path parallel to its axis, and to contain the energy within or adjacent to its surface. In many optical applications it is desirable to filter light that is propagating within a waveguide, perhaps an optical fiber, in order to eliminate or redirect light of certain wavelengths or to pass only light of certain wavelengths.

Many types of filters, including interference filters, are commonly used for this filtering. However, there are a number of difficulties associated with the use of many types of filters, including interference filters. First, in some applications the power density of light propagating within a waveguide may be unacceptably high for the filter, having detrimental effects that may include damage to the filter material or reduced filter performance.

Also, filters are typically employed by means of bulky, multiple-optical-element assemblies inserted between waveguides, which produces a variety of detrimental effects. Separate optical elements can be difficult to align in an assembly and it can be difficult to maintain the alignment in operation as well. Each element often must be separately mounted with great precision and the alignment maintained. Also, an increase in the number of pieces in an optical assembly tends to reduce the robustness of the assembly; the components may be jarred out of alignment or may break. In addition, interfaces between optical elements often result in significant signal losses and performance deterioration, especially when an air gap is present in the interfaces. The materials of which the additional elements are composed may also introduce fluorescence or other undesirable optical interference into the assembly.

The size of filtering assemblies is often a problem as well. Not only can it be difficult to manufacture a filter on a small surface area, but also filtering assemblies usually contain bulky light-collimating, alignment and mounting components in addition to the filtering element. However, space is often at a premium in optical assemblies. In addition, the filtering characteristics of interference filters change depending upon the angle at which light is incident on the filter, and interference filters are generally designed for the filtration of normally incident light.

High performance filters have shown particular promise in many applications as described in Applicants U.S. patent application Ser. No. 09/267,258 (now U.S. Pat. No. 6,222,970) and U.S. Pat. No. 5,953,477. There is an ongoing demand for assemblies in these and other industrial and medical applications that have less noise. In telecommunications the demand for more useable bandwidth is growing at an incredible rate. That telecommunications demand and the recognized need for more effective medical and environmental diagnostic tools (for example those described in the referenced U.S. patent application Ser. No. 08/819,979 now issued as U.S. Pat. No. 5,953,477) are resulting in the need for assemblies having improved signal to noise ratio.

From Section of U.S. patent application Ser. No. 09/318,451 Captioned "Summary of the Invention"

This invention provides a surprisingly effective optical noise reduction in optical assemblies by controlling or limiting unwanted photon entrance, reflection, departure or appearance in or from the assembly. Applicants have found such unwanted photons passing through areas that had not been recognized or had been vastly underestimated as photon passageways potentially creating significant problems. Applicants have further found the optical performance loss because of these areas to present special, technology limiting problems in applications benefiting from high performance filters. More specifically, applicants have found that penetration of unwanted photons especially in areas along periphery of the filter layers, even very thin filter layers, can cause significant noise or effective signal erosion. This is especially true when optical transmission purity/high optical performance is essential. That unwanted photon penetration occurs not only through edge surfaces but also through face surfaces and edge junctures. The edge juncture is where the filter edge surface joins a filter face surface or a filter face surface joins another face, for example, of a waveguide, including an optical fiber. Problematic optical noise can occur through the filter face itself if, for example, some areas of the filter or the waveguide to which it is optically connected have differing transmission characteristics or demands. In accordance with this invention improvements are obtained by selectively covering with a material opaque to the unwanted photons those areas that would otherwise allow the unwanted penetrations. Assemblies according to one embodiment of the invention when used to cover such junctures can effectively be utilized as universal adapters for connecting fibers to one another or to optical devices for specific applications, for example, in chemical analysis and or communication facilitating devices. A fiber identification mechanism assures proper fiber matching and alignment.

From Section of U.S. patent application Ser. No. 09/318,451 Captioned "Detailed Description"

Figure 8:
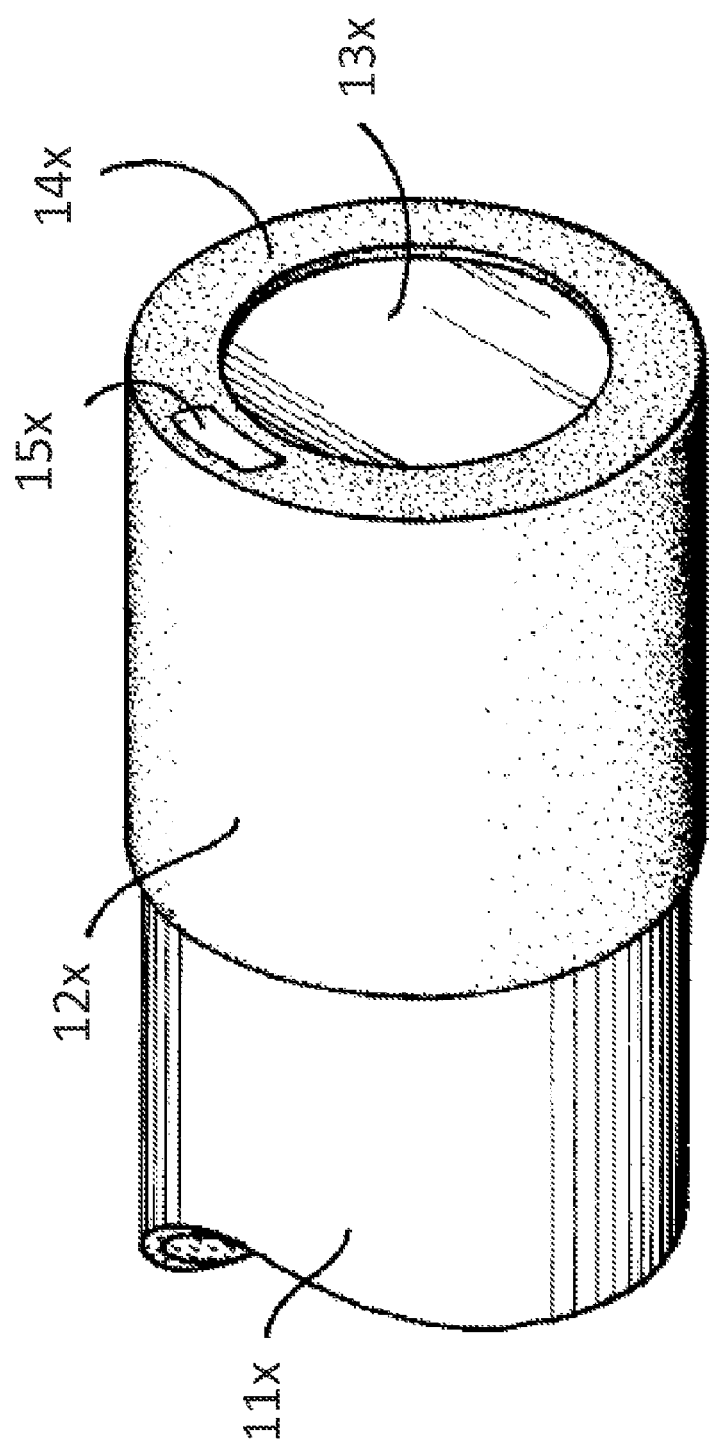
FIG. 8 is a perspective of an optical assembly end portion illustrating a masked, filtered fiber end, from U.S. patent application Ser. No. 09/318,451.
Figure 9:
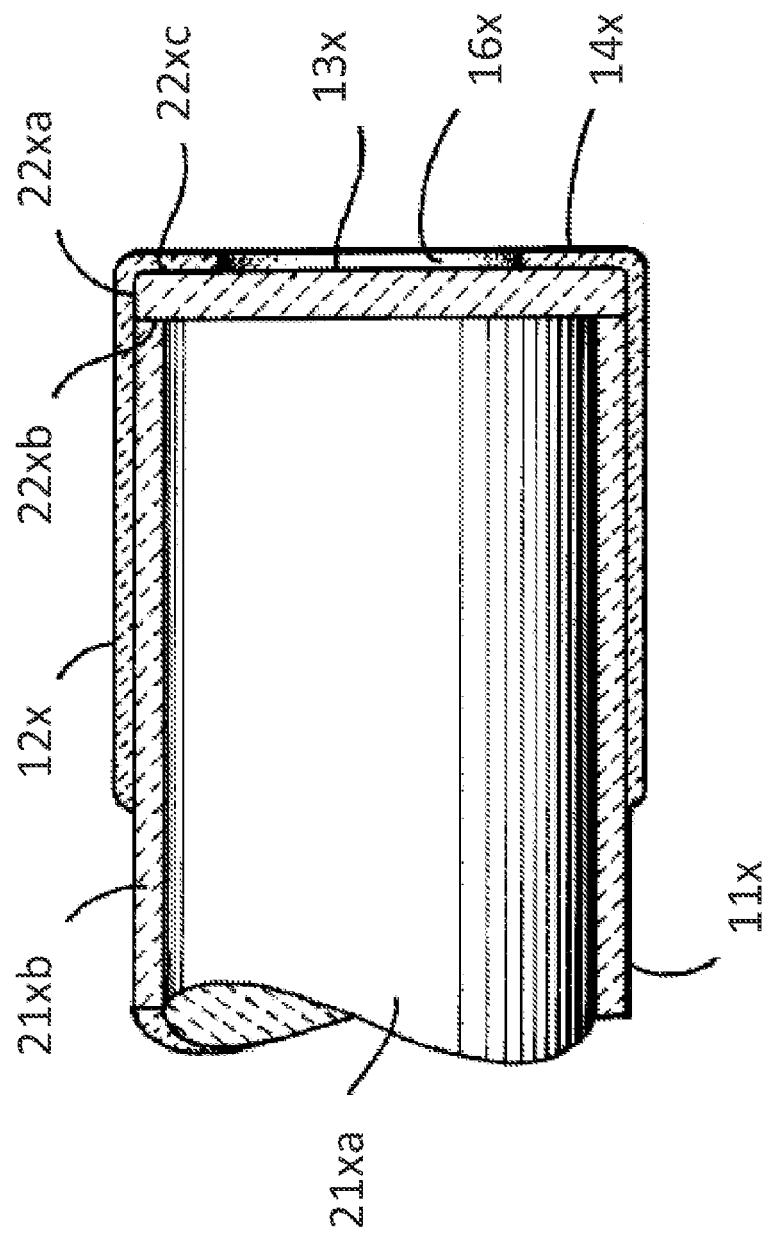
FIG. 9 is a cross sectional magnified view of an optical assembly in accordance with FIG. 8 with exaggerated fiber core, filter, and mask thickness dimensions, from U.S. patent application Ser. No. 09/318,451.

A preferred embodiment of the present invention is illustrated in FIG. 8 and FIG. 9. In FIG. 8 the end of an elongated waveguide, in the illustration an optical fiber 11x, is shown having at its end mask 12x. Mask 12x partially covers the filter end face 13x at the end face periphery 14x. Mask 12x is opaque to at least some wavelengths of light. Accordingly, light of the opacity wavelengths do not penetrate mask 12x thereby eliminating unwanted optical noise that would result from such light penetration of the mask covered areas. Such optical noise is particularly problematic in applications requiring high performance, for example, in high bandwidth telecommunications, and those applications requiring the ability to differentiate between ordinarily small signal differences, such as in Raman spectroscopy. Applicants' U.S. patent application Ser. No. 09/267,258 now U.S. Pat. No. 6,222,970 describes high performance filters that are an important factor in enabling the user to get to new performance levels. For the foreseeable future there is a conspicuous need for ever increasingly higher performance levels. Applicants have found the apparently extreme measures according to this invention to enable performance levels at which the otherwise tolerable noise is problematic. In accordance with a preferred embodiment of the present invention high performance filters combined with masking eliminates significant sources of unwanted light penetration.

U.S. patent application Ser. No. 08/819,979, now issued as U.S. Pat. No. 5,953,477 referenced above describes filter performance requirements for demanding applications, such as Raman spectroscopy. These requirements include: a) high throughput in transmission wavelength region; b) high-attenuation (dense) blocking in rejection wavelength regions; c) steep transition between wavelength regions of rejection and transmission; d) environmental stability; e) low ripple in passage regions, f) minimal sensitivity to temperature variation; g) no performance fluctuation with ambient humidity or chemicals; h) the ability to withstand high, and rapidly changing, temperatures present in sterilization processes and industrial processes; i) physical toughness; and j) tenacious adhesion between filter and substrate.

These desirable filter performance properties are achieved in high performance filters, thin-film filters having a large number of alternating high/low refractive indices, stacked layers deposited on a substrate. Between 20 and 150 layers are usually required depending on such factors as: 1) the performance required for the end use; 2) the refractive index differential between materials in adjacent filter layers; 3) the consistency and purity of the filter layer; and 4) the sophistication of the filter design process. And, the layers must be free from defects and voids such that the material characteristics of the layer approaches that of a bulk solid and the packing factor of the layer approaches 100%. Achieving high-density packing requires the molecules depositing onto the substrate to be highly energetic. During the layer deposition process, this energy prevents the forming layer from orienting itself into columnar or similar structures that are riddled with voids. While the depositing layers are predisposed to forming the imperfect structures, the high energy forces pack the molecules (or atoms) into any voids or pinholes which may exist.

Even though the techniques described in U.S. Provisional Application Ser. No. 60/038,395 provide an extremely attractive means of filtering optical fibers, the present invention provides further and now recognizable signal quality improvements. The present invention has particular advantages for instrumentation applications, such as Raman, fluorescence, and other spectroscopic analyses. They are also devised for wavelength division multiplexing, telecommunications, general fiber optic sensor usage, photonic computing, photonic amplifiers, pump blocking, fiber-integral active devices such as fiber-coupled (pigtailed) lasers and lasers utilizing the fiber as the lasing cavity.

In one embodiment of the present invention, a thin-film interference filter is applied to a fiber end face. The fiber core may have an essentially uniform cross section. Alternatively, the fiber, monomode or multimode, may be up tapered so that the cross section of the core is enlarged at the filter end face and filtered light is angularly redirected or collimated. The filter has a packing density of at least 95%, but preferably greater than 99%. A fiber with an integral, masked filter is utilized for analytical instrumentation/sensing applications generally and spectroscopy more specifically showing improvement even over applicants previous advanced probe systems. The coating of the filters on the fibers can be accomplished especially effectively by a method described in applicants U.S. patent application Ser. No. 08/819,979, now issued as U.S. Pat. No. 5,953,477, discussed in more detail below in reference to FIG. 11 and FIG. 12. The utilization of high packing density filters in conjunction with up tapered fibers is described in applicants U.S. patent application Ser. No. 09/280,413 now U.S. Pat. No. 6,208,783.

Figure 15:
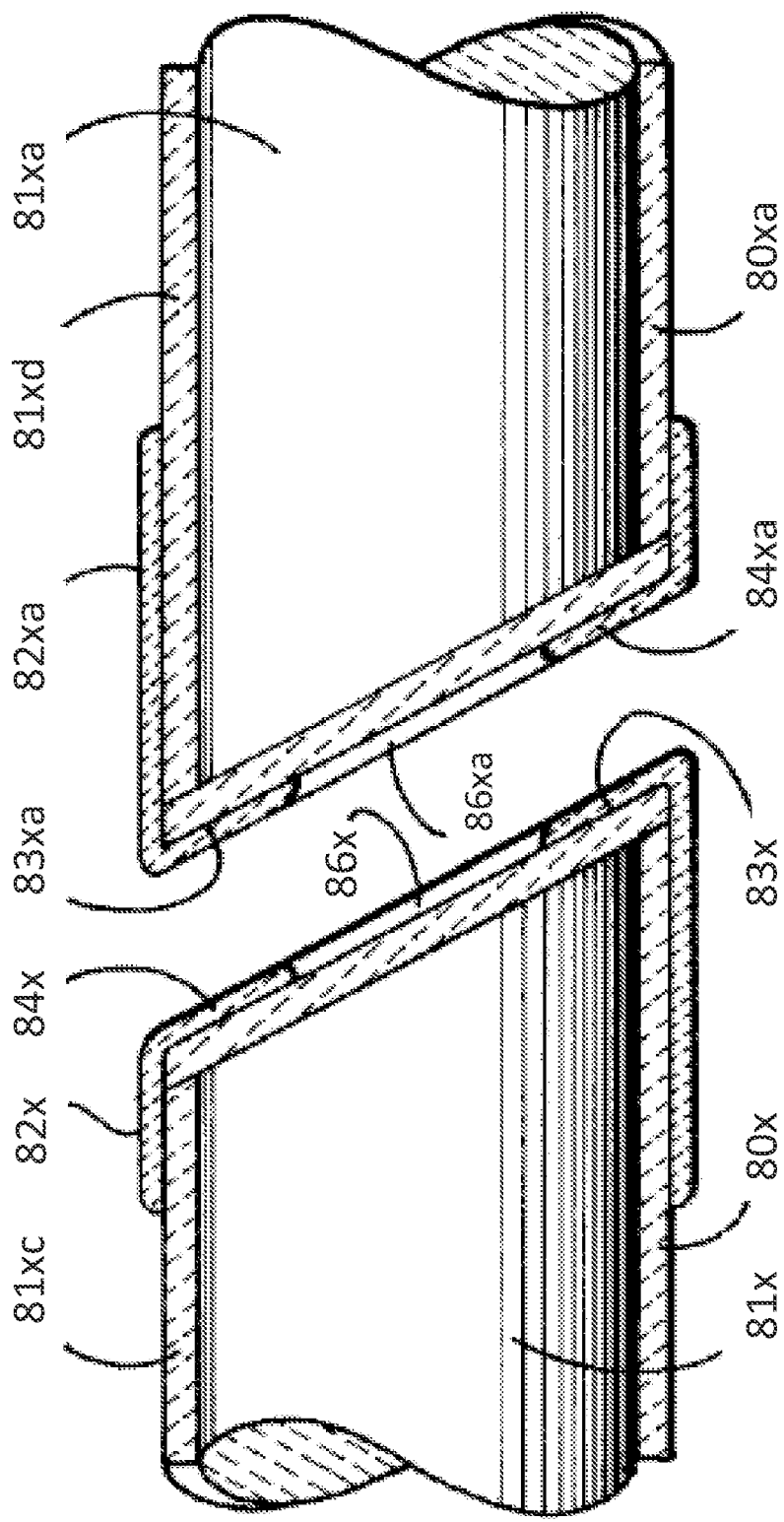
FIG. 15 is a cross sectional view illustrating two optical assemblies each having beveled end faces with mask end near mask end configuration illustrating mating orientation, with exaggerated fiber core, filter, and mask thickness dimensions, from U.S. patent application Ser. No. 09/318,451.

As shown in FIG. 15, described in further detail below, the filter can be applied at an angle of approximately 45 degrees such that the reflected and transmitted light can be transmitted to locations in an optical assembly for subsequent processing. The filter can be oriented at an angle greater than the maximum angle of light propagation within the fiber so that reflected light from the filter cannot back propagate during low-light spectroscopy application, such as Raman. Variability can be introduced into the thin-film application process so that filters of various wavelengths can be produced within a batch. The variability can be provided by masks, intermittent blocking of the deposition particles, off centering, and raising and lowering the substrate. The slightly different filters can be graded and sorted.

Figure 14:
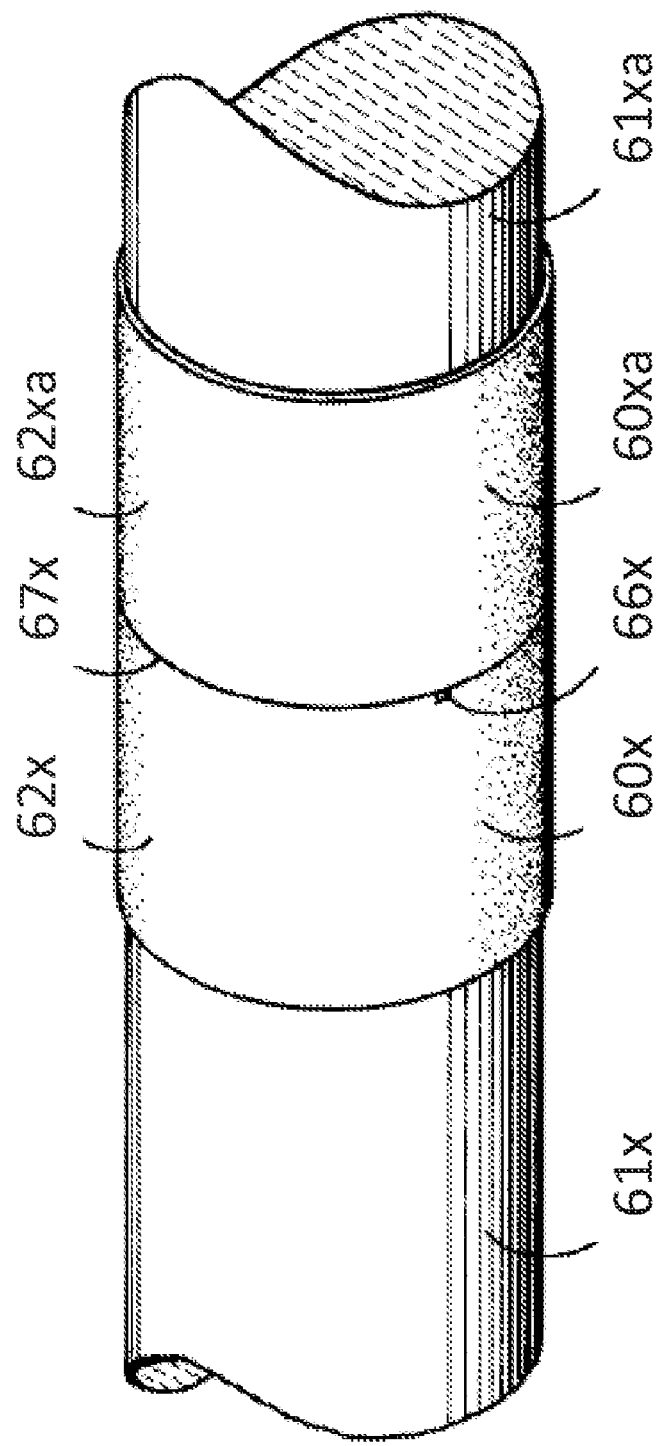
FIG. 14 is a perspective of two optical assemblies in mask end to mask end, mating connection, from U.S. patent application Ser. No. 09/318,451.

Several short, filtered fiber segments can be aligned end-to-end with one another. One end of each fiber segment is angled and has a filter applied to its surface. The opposite, unfiltered ends of the fiber segments may be flat or formed with mating bevels. The filters are slightly offset in wavelength from one another. The assembly can be used to tap off signals according to wavelength or input wavelength-separated signals as illustrated in FIG. 14.

The preferred thin-film deposition processes impart sufficient energy to the depositing molecules so that the forming structure is essentially fully packed (100% comprised of the desired molecules, essentially nonporous, and free of voids and pinholes). For best performance, the structure should approach or equal 100% (greater than 99%) packing density, but at least 95%. Due to this and other factors, adherence to the fiber substrate is tenacious. The effects of the residual mechanical stresses created as a result of the high energy deposition of the filter material are negligible since the fiber is very strong in relation to its diameter. Several thin-film processes are particularly well suited to produce this high-density, hard-coated filter. These processes include magnetron sputtering, single- and dual-beam ion sputtering, ion plating, and ion-assisted deposition (typically slightly less performance and lower packing densities). Reactive- and nonreactive versions of these processes are available. The reactive processes are typically faster in terms of the time required to produce a thin-film coating. These and similar processes contrast with conventional processes, such as evaporative films, which achieve packing densities of approximately 80%. Ion-assisted deposition produces films with densities typically in the 95% range and for this reason are less preferable. In short, a filter with high packing density greater than 99%, preferably approaching or equaling 100%, but at least 95%—is applied directly to the fiber end face utilizing highly energetic, nonconventional thin-film deposition processes.

Fiber optic applications benefit from the availability of filtered fibers with slightly varied wavelengths. These applications include: 1) wavelength division multiplexing (input and output); 2) tapping off spectroscopic wavelengths for detection; and 3) matching filters to lasers with varying but closely grouped wavelengths.

Figure 13:
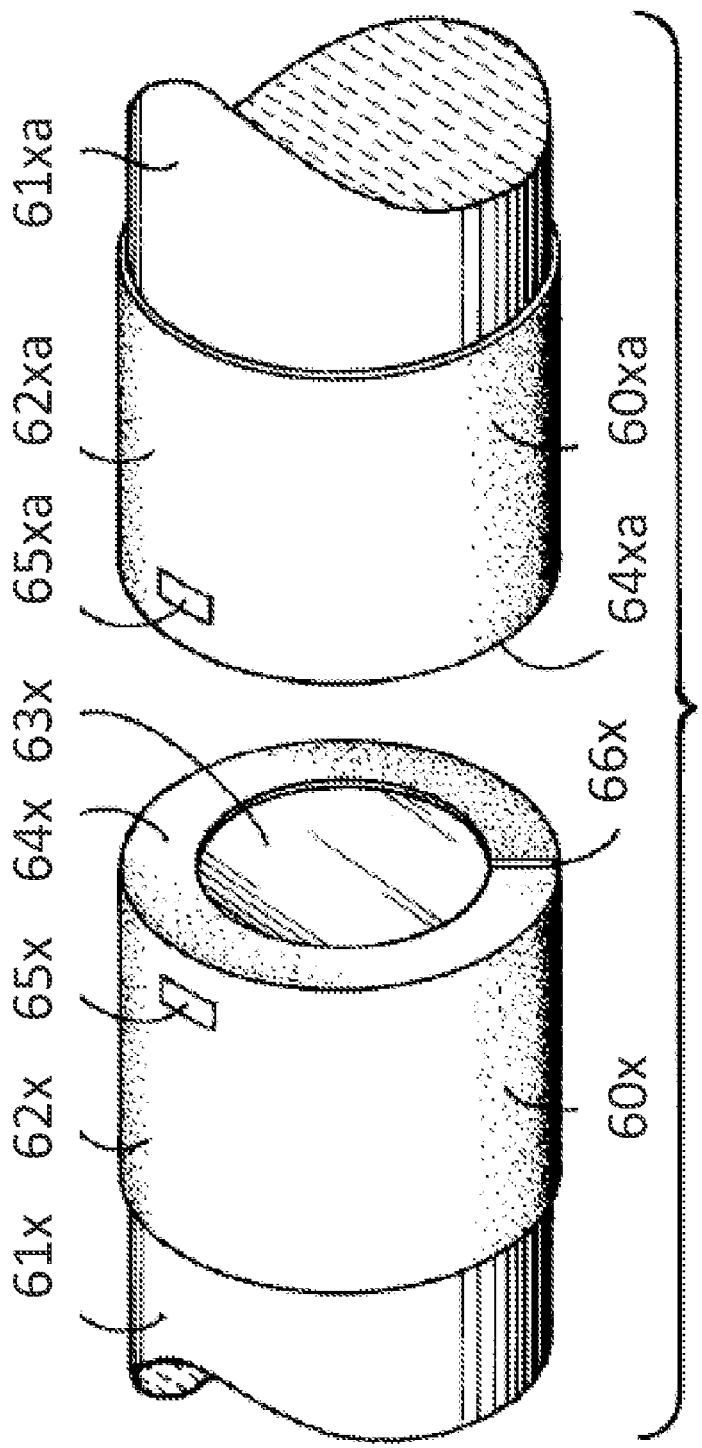
FIG. 13 is a perspective of two optical assemblies with masks placed in mask end near mask end configuration illustrating mating orientation, from U.S. patent application Ser. No. 09/318,451.

In a further preferred embodiment of this invention the mask serves as a significant component in facilitating mating with other waveguide structures. Space 15x is reserved for micro bar code, magnetic or other identification information that will assist in assuring appropriate alignment and mating of the optical assemblies. For example, the mask dimensions and characteristics could be identified. In addition the fibers core and polarization axes can be identified with respect to the location of the identifier and the mask aperture location, configuration and dimensions. Also, the core dimension and location can be identified. When fiber to fiber connections are made, often testing and aligning can be a time consuming task. Proper information in the identifier space could minimize the testing burden. Using code in identifier space 15x to reference specific, detailed computer link information would allow for unlimited information about the optical assembly. The identifier information could be located at other locations on the mask, but the space is desirably located where it could be used in automating manufacturing systems. If the optical assembly is likely to be end to end connected to another assembly in which subsequent identification is useful, for example as illustrated in FIG. 13 and FIG. 14, an identifier on the edge can be used.

The mask of this invention is an integral part of the operable optical assembly. Thus, it is desirable that the mask be robust and adhere to the filter in a manner that it is not too easily removable. The masking material for the present invention can be applied in a number of ways and can be made of a variety of materials, including metals, oxides and plastics. The precise manner of forming the mask of this invention and the material used in any given application depends on its environmental demands. Fluorinated plastics sold under the trademark Teflon and black epoxy work well in many chemical applications. Durable metallic masks, for example, silver or platinum, are used in a particularly advantageous embodiment of this invention. These metallic masks can be applied using, for example, precision machining or electrolytic deposition and plating techniques. By using photo-resist material and standard photoresist techniques (see, for example, the descriptions for temporary mask formation in U.S. Pat. No. 5,237,630 to Hogg et al.) a temporary mask is formed in surface areas of the pre-assembly filtered fiber that are not to be covered with the durable mask. The temporary mask photoresist material is applied uniformly over the entire filtered fiber end portion. The photoresist material is then exposed imagewise (to distinguish where the durable mask is and is not to be). The photoresist is removed (usually by solvent wash) from the areas where the durable mask is to be. The metallic layer is then deposited, e.g. by electrolytic deposition, over the entire filtered fiber end portion. As the temporary mask is removed using a solvent wash (with a different solvent) any metallic deposition covering the temporary mask is also removed leaving only the durable metallic mask.

Because the durable mask must withstand rigors of an operational environment and adhere firmly to the substrate filter and/or fiber it is important in many deposition environments to assure that the substrate be thoroughly clean before applying the durable mask material. A particularly advantageous method for applying the durable mask uses photoresists in another conventional manner, different from that described above. The fiber end portion is first cleaned thoroughly and then coated over its entire surface with the durable mask material to the desired thickness. Then a photoresist is applied over the entire area. The photoresist in this application is chosen, imagewise exposed and developed so that after development resist remains only in the image pattern of the desired durable mask. The durable mask material is then removed in the non-image areas by chemical washing or selective etching (etching only in those areas not covered by resist). The remaining photoresist material is then removed leaving the durable mask in a precise mask image pattern. In some applications it may be desirable to repeat the process to form multiple layers of mask having differing compositions and/or image patterns.

The structure of a preferred embodiment of this invention is illustrated in more detail in the FIG. 9 cross sectional view in which mask 12x is shown covering: (a) filter edge surface 22xa; (b) the area of junction between the filter and the fiber 11x end face 22xb; (c) the area of junction between the filter edge surface and the filter face 22xc; and (d) the peripheral portion of the filter face surface 13x distal to the fiber 22x d. The diameter of core 21xa is exaggerated in this view. Correspondingly the cladding 21xb is shown as much thinner than it normally would be. The approximate ratio of cladding thickness to core diameter in a monomodal fiber is generally about 20 to 1. Thus for a 120 micron fiber the core diameter would likely not exceed 6 microns. The overlap 14x of mask 12x over distal filter face periphery is also exaggerated. This overlap 14x of mask 12x is depicted in FIG. 9 as being sufficiently extensive to mask light that would otherwise impinge directly on fiber core 21xa. Overlap 14x could also be a minimal overlap to extend just a short distance toward the core center covering only the peripheral portions of filter face 13x and masking only light that would otherwise impinge on cladding 21xb. In a preferred embodiment overlap 14x of mask 12x on filter face 13x is circumferentially uniform, defining a circular aperture to filter face 13x. In another preferred embodiment the aperture diameter is larger than the diameter of the fiber core and exposes the entire core face. Cavity 16x formed at its circumference by the overlap of mask 12x and at its side proximate the fiber by filter face 13x can be used as a nesting cavity, e.g., for a sensor or an additional filters or durable masks.

By using, for example, precision tooling, photoresist technology and/or stereo lithographic methods, the resultant masks can be of unique, complex or simple, repeatable shapes. The masks can be formed to perfectly conform to the substrate shape. The masks can also be formed to precise exterior dimensions. The mask can be formed on the fiber or can be formed on mandrel for later application to the fiber. The filter can be formed on the fiber before application of the mask, or the filter can be applied with the mask. The thickness of the mask can be extremely thin and precise for some applications where, for example, only photons of a selected wavelength are intended to pass through the mask. The thickness can be variable, for example, when an exterior mask dimension, e.g. circumference, needs to be made to a predetermined dimensional tolerance. Another example of where the thickness is desirably variable is when there is more than one layer in some areas of the mask, as described above.

Figure 10:
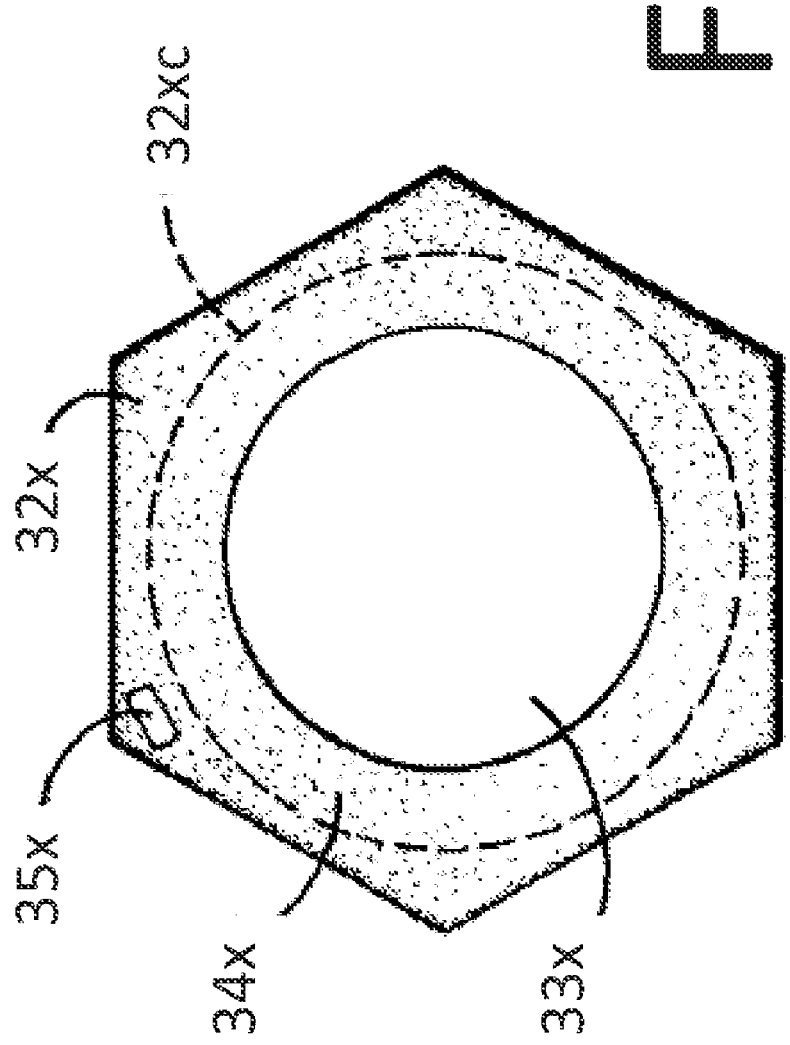
FIG. 10 is an end view of an optical assembly illustrating a mask having a hexagonal exterior profile and a circular aperture, from U.S. patent application Ser. No. 09/318,451.

FIG. 10 is an end view of an optical assembly in which mask 32x has a cross sectional configuration of a hexagon for at least some of its axial length. Its aperture is circular exposing filter end face 33x. The dashed circle 32xc illustrates the circumference of filter end face 33x and the extent of overlap 34x of mask 32x overlapping filter end face 33x. The hexagonal structure is one of a wide variety of shapes that can be chosen to accommodate coupling to other structures in a more easily fixed relationship. The identifier is conveniently located in a corner of the hexagonal mask 32x where it can have additional space and remain uncovered during manufacturing operations.

Figure 11:
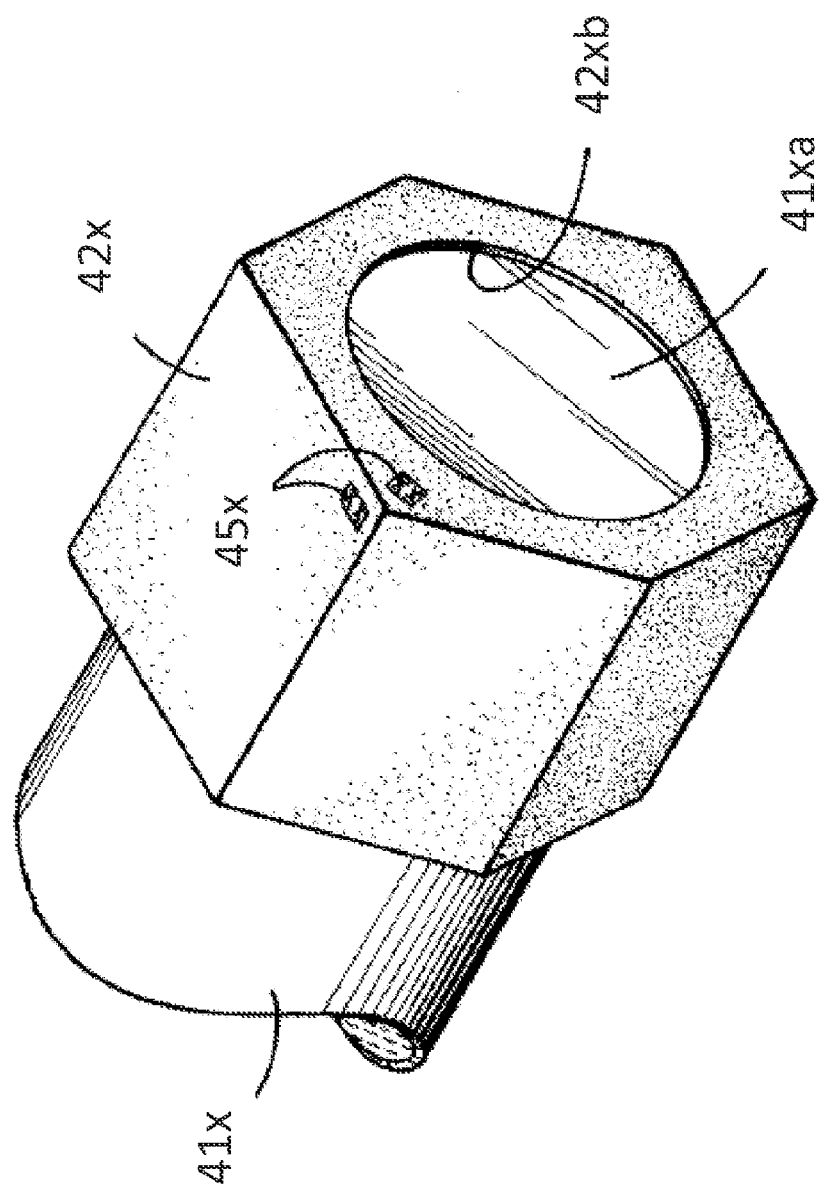
FIG. 11 is a distorted perspective of an uncompleted optical assembly end portion illustrating a mask precursor having a hexagonal profile, from U.S. patent application Ser. No. 09/318,451.

In some applications, for example where space is limited, it is desirable to form the mask as a single unit in the late stage of manufacturing the assembly. However, in some larger scale production operations, for example, the mask is desirably formed in two stages. In the first stage as illustrated in FIG. 11 a mask portion 42x having a cylindrical inside surface 42xb mated to or formed around, for example, optical fiber end portion 41x exposing fiber end face 41xa. The outside surface 42x can be of the wide variety of shapes mentioned above for accommodating fiber coupling, with FIG. 11 illustrating a hexagonal axial external structure. Note that in this preferred embodiment identifier spaces occur on both the exterior surface 42x and the face surface of the first stage mask portion. The filter is then applied at a later stage of manufacture. The mask is also completed by adding a second stage (and any necessary additional stages) after the filter is applied to the fiber end portion 41xa.

Figure 12:
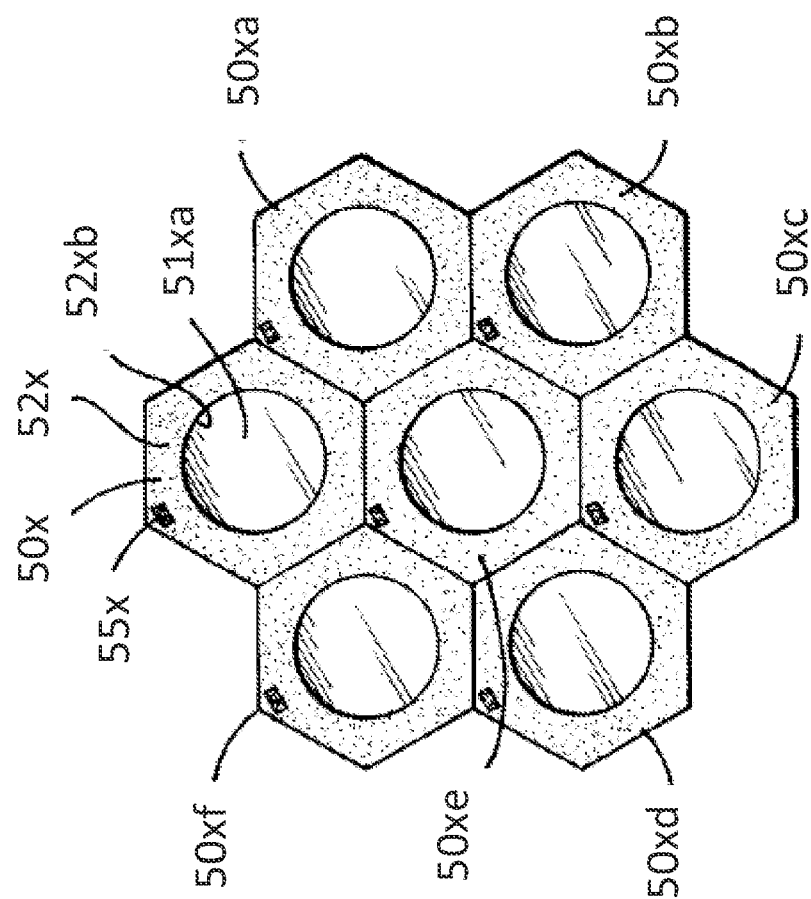
FIG. 12 is an end view of a cluster of uncompleted optical assemblies end portions, from U.S. patent application Ser. No. 09/318,451.

FIG. 12 illustrates a further step in the manufacturing process in which a cluster of units of the type illustrated in FIG. 11 is accumulated. Each unit includes a mask portion (with radial thickness exaggerated) surrounding a fiber. The individual units are in compact relationship to each other. The close relationship, effectively allowing no gaps between mask portions, gives rise to significant manufacturing advantages.

One step necessary in applying high performance filters to fiber end faces is to thoroughly clean and polish the fiber end faces. Applicants have found a very effective way of accomplishing that polishing. The method is disclosed in Applicants U.S. patent application Ser. No. 08/819,979, filed Mar. 13, 1997, now issued as U.S. Pat. No. 5,953,477, mentioned above, which is incorporated herein by reference. In brief the method involves aggregating a large number of fiber segments in bundles with segments parallel and in intimate relationship with the end of each segment that is to be coated approximately even so that the aggregate ends form a roughly planar surface. The segments are firmly held together and polished as a single unit to a 0.3 micron finish. By holding the segments tightly together the amount of polishing debris that can get between the segments is held to a minimum. After drying the bundle multilayer filter coating is applied to the polished surface of the aggregated fibers.

Applicants have found that even after thorough washing, small particles of debris remain on some fibers. That debris can reduce the yield of acceptable filtered fibers especially with the high quality demands of today. The debris largely gets trapped in the small spaces between the generally circular fibers. One way to assure that the segments are clean is to separate the bundle and wash the fibers individually. On a small scale that is practical. However, on a large scale separating the fibers to wash them and then bundling them again for coating is difficult and cost prohibitive. Although the FIG. 12 illustration uses only seven fiber/mask units each having fiber end portion 51xa encased in mask portion 52x with identifier space 55x, the number of such units in a single cluster in the manufacturing process can reach into the thousands in higher volume operations.

For reasons which will become evident below, each of the units in this preferred embodiment has an additional identifier space on its exterior face as illustrated in FIG. 11. Using the mask portions in the FIG. 12 illustration eliminates spaces between units. By using a bundling material that holds the mask portions compactly together and surrounds the bundle intimately, there is literally no space for debris to accumulate. In this preferred embodiment one or more locator means (e.g., bar code information) would also be fixed to or on the bundling material for holding the units together. The bundling material, for example Teflon tubing (Teflon is a DuPont trade name for a polyfluorinated hydrocarbon material) is then heat shrunk to hold the mask portions together tightly. The fiber end of the bundle is first scanned for digitization to, for example, record details from the identifier spaces as well as getting configurations of each of the fibers and their associated masks. (Fibers do not all have identical faces.) The fiber ends with mask material is polished to a 0.3 micron finish, the surface washed thoroughly and dried. The surface is again scanned thereby registering changes, for example, to fiber face dimensions. This second scanning is frequently useful but is particularly appropriate when beveled end faces are created in the polishing operation. (See FIG. 15 and U.S. application Ser. No. 08/819,979, filed Mar. 13, 1997, now issued as U.S. Pat. No. 5,953,477, mentioned above.) Depending on the assembly requirements, the filter is then applied directly to the entire surface (mask material and fiber). The peripheral extremity of the filter on each unit is then removed by, for example, using photoresist and selective etching. A surface mask portion (the second stage mask portion) can then be applied also using, for example, the photoresist methods described above.

The second stage durable mask in one preferred embodiment covers all of the filter edges and any selected portions of the filter face. Additional mask layers can be added subsequently as desired with different or identical patterns. In a preferred embodiment of this invention, the surface is first scanned, digitized and information about the individual fibers is recorded as indicated above. The filter is then deposited on the entire surface in the manner consistent with that set forth in applicants copending U.S. patent application Ser. No. 09/267,258, filed Mar. 13, 1999 identified above and incorporated herein by reference. Then a first photoresist is applied, imagewise exposed, and developed to expose those areas where filter material is to be removed (for example, the remaining resist covers entire fiber surface 51xa of unit 50x and areas corresponding thereto on each of the mask material-fiber units 50xa-xf). The filter material is then etched off as indicated above. The surface is again thoroughly cleaned. A surface mask portion is then applied. The remaining photoresist material is then removed leaving a surface of durable mask material and filter covering the fiber surface. Additional layers and/or patterns of durable mask material is applied depending on the specific intended use of the optical assembly.

FIG. 13 illustrates optical assembly 60x and 60xa with the end of mask 62x of assembly 60x near the end of mask 62xa of assembly 60xa ready for end to end connection. A further advantage of applicants robust mask is that it can be used in end to end connections for waveguides. In FIG. 13 metallic mask 62x is aligned with 62xa such that the aperture to filter 63x defined by overlap 64x mates with the corresponding aperture defined overlap 64xa (hidden from view by perspective). It is important in many applications to align fiber 61x with fiber 61xa to achieve maximum effectiveness. This alignment can be accomplished by using test equipment which sends light through the fibers. One fiber is rotated to achieve the correct result. Using information provided on identifier spaces 65x and 65xa (in combination to reference sources that may be stated therein) the alignment is accomplished without such on site testing. Optional control port 66x is discussed with reference to FIG. 14 below.

FIG. 14 illustrates assembly 60x's mask 62x end to assembly 60ax's mask 62ax end relationship. After aligning fibers 61x and 61xa mask 62x and 62xa the two are welded together by applying an electric field to the juncture seam 67x. When connecting optical fibers end to end it is not uncommon for the weld to be a point of weakness for the fiber, especially when a filter is incorporated at the weld. By using applicants mask overlap as for the weld the juncture can be very strong, limited only by the specific amounts and materials used. That joint can also provide a point for connecting other components using for example, metal solders, or for controlling the electric or magnetic field inside the cavity formed by the mask overlap. That cavity can be constructively used, for example, by encapsulating a material that enhances optical performance or a wafer that may function as an amplifier, a sensor or some other useful device. Using the masks of this invention to connect fibers also decreases unwanted cross talk between fibers while making available sites for wanted communication between fibers. Optional control port 66 allows for inserting, for example, materials for filling the cavity as described above or a control light or tap into the cavity.

FIG. 15 illustrates two optical assemblies 80x and 80xa having mating beveled end faces in mating orientation. In this case prior to beveling the fibers would be aligned. The bevel thereafter generally defines the mating orientation. Core 81x and 81xa align and claddings 81xc and 81xd align. When optical assemblies 80x and 80xa are brought together overlap 84x of mask 82x will meet with overlap 84xa of mask 82xa. Fusion of overlap 84x with overlap 84xa will result in a cavity formed at its peripheral edge by overlaps 84x and 48xa and at its sides by filter end faces 83x and 83xa with its volume defined by the sum of cavities 86x and 86xa.

Figure 16:
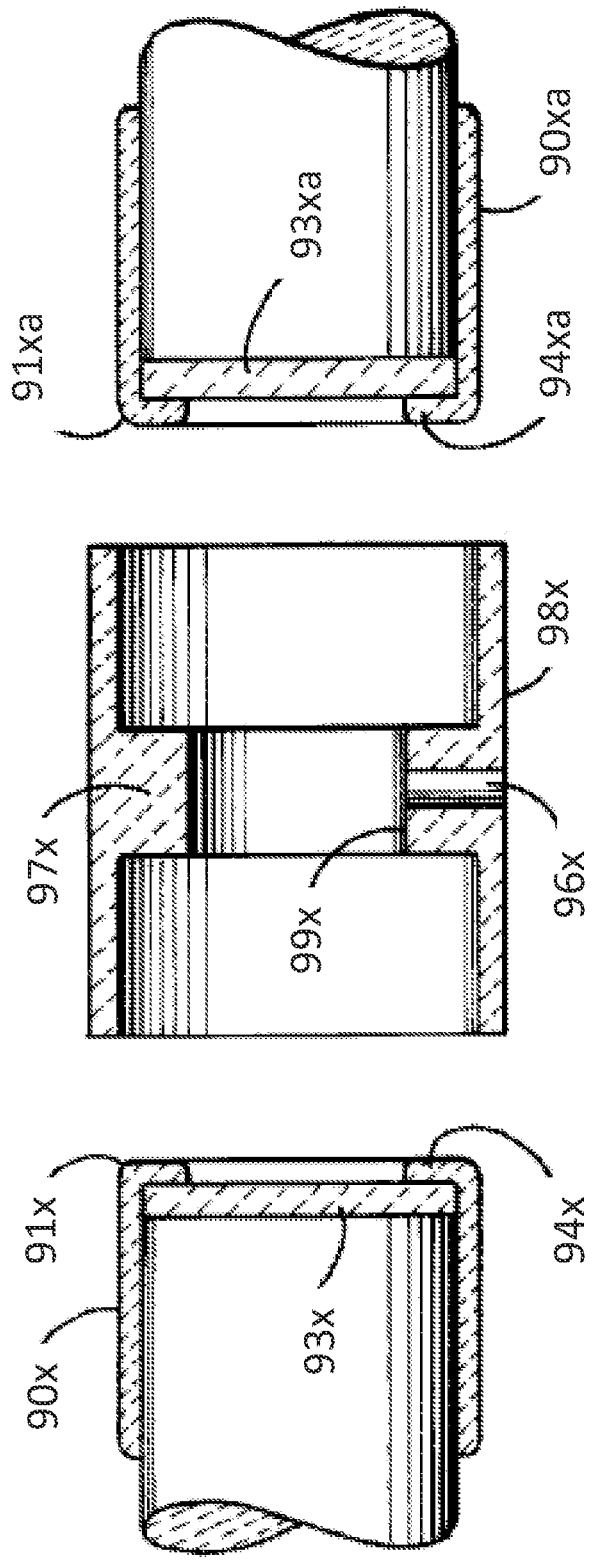
FIG. 16 is a cross sectional view illustrating two optical assemblies oriented for end to end splice using a connection device mated to the masked assembly ends, from U.S. patent application Ser. No. 09/318,451.

In the FIG. 15 structure and in the structure illustrated in FIG. 13 and FIG. 14 the cavity optical length dimension is controlled by the thickness of the combined mask overlap thickness. This provides between the two filters (if each assembly has a filter) a resonant cavity of short, precise dimension. Various materials, for example, non-linear materials, polarizing structures, or light sensitive crystals, can be placed between the filters to optimize the cavity for particular purposes. Calcite provides a material base for one such polarizing structure; another polarizing material is commercially available from Corning Incorporated marketed under the trade name Polarcor. The polarizing function reduces a filter's spectral deviation to angle of incidence variation. FIG. 16 illustrates yet another advantage of the masks of this invention. To the extent one desires an optical path length longer than would be provided conveniently in the FIG. 14 and FIG. 15 illustrations, in FIG. 16 the masks 91x and 91xa of optical assemblies 90x and 90xa respectively in another preferred embodiment of this invention are tailored to fit conveniently into cylindrical connector 98x. Overlap 94x and overlap 94xa are inserted into connector 98x to butt with spacer 97x of connector 98x. The length of spacer cylinder 97x is chosen so that the sum of the length of spacer cylinder 97x plus the cavity length resulting from overlap 94x and 94xa (the resulting distance from filter 93x to filter 93xa) is the desired resonant cavity length. Optional port 96x provides the opportunity for loading the resonant cavity with material or useful components as described with reference to FIG. 14 above. Assemblies 90x and 90xa are secured to connector using, for example suitable adhesives or locking methods such as those mentioned below.

Figure 17:
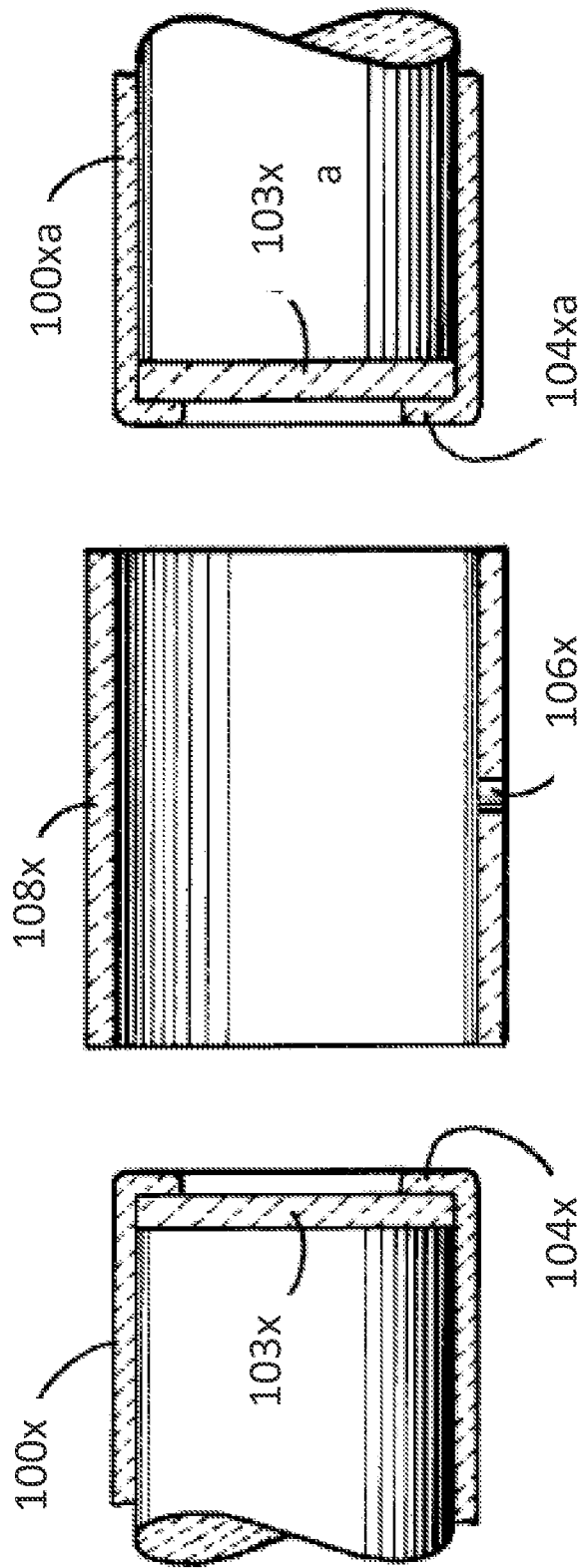
FIG. 17 is a cross sectional view illustrating two optical assemblies oriented for end to end splice using a connection device having a fluid entry/evacuation port, from U.S. patent application Ser. No. 09/318,451.
Figure 18B:
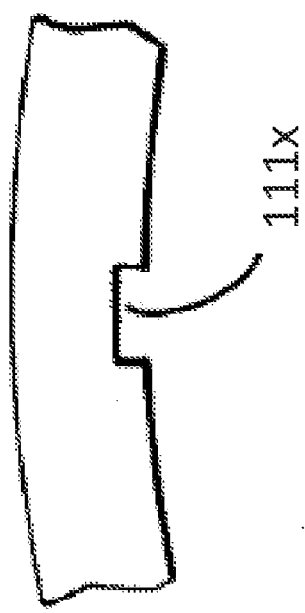
FIG. 18 includes 18a, which is an end view of a splice connection device as in FIG. 17 and including a channel for aligning the fiber end faces, and 18b, which is a blow-up of the channel and its surrounds, from U.S. patent application Ser. No. 09/318,451.
Figure 18A:
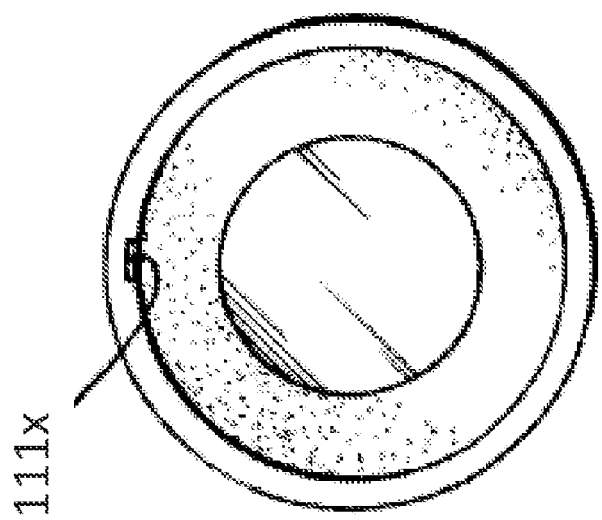

A further advantage of applicants mask is the ease with which the masks lend themselves to standardization. Thus the mask exterior dimensions are standardized to mate with the interior of a standardized connector configuration. FIG. 17 illustrates another example of such a standard connector 108x. Optical assemblies 100x and 100xa are inserted into connector 108x to the point where overlap 104x meets 104xa at the region where port 106x extends through the wall of connector 108x. This illustrates a further use of port 106x as an evacuation port to assure intimate contact of overlaps 104x and 104xa. Of course the port could also be used as described above. FIG. 18 illustrates a further enhancement of the connector showing in FIG. 18a an end view of connector 108x of FIG. 17. Connector 108x has been modified in the FIG. 18 illustration to include an alignment channel 111x. Channel 111x is illustrated in more detail in blow up in FIG. 18b. The channel also provides a locking mechanism by including a turn in the channel. Masks 100x and 100xa also are modified to adapt to the FIG. 18 connector by including a nub on the periphery of each of mask 100x and 100xa sized to mate with channel 111x. The length of the nub is sized to accommodate the channel direction turn in the locking mechanism.

As illustrated above the masks of this invention provide a convenient and effective system for manufacturing optical assemblies for high performance. The system includes a first unit with an optical fiber end connected to a high performance filter. The filter/fiber end is circumscribed by a mask that adheres to the fiber and has external dimensions and configuration that are readily reproducible. The mask preferably has a surface that protrudes onto the face of the filter, thus keeping unwanted photons from passing through edge and surface juncture areas and creating noise to an ultimate signal. The external dimensions of the mask mate with an appropriately configured female connection means. The connection means can be double ended for further connection to another fiber with a mask like that on the first unit. The connection means could also be configured to connect to another device such as a spectrophotometer. By providing a mask on the high performance filter end that has standard external dimensions and a connecting means matable with the mask the ultimate assembly of final product in high volume/high speed operations is simplified.

The present invention has been described in relation to particular embodiments that are intended in all respects to illustrate and not restrict. Other embodiments will become apparent to those skilled in the art to which the invention pertains without departing from the inventions spirit and scope. Accordingly, the scope of this invention is defined by the appended claims rather than the above description.

From U.S. Patent Application 60/213,983 Entitled
"Micro Identifier System and Components for
Optical Assemblies"

This invention relates to facilitating automation of high quality optical assemblies in which waveguides are included and to methods for improving quality assurance and repair of such assemblies. Such assemblies have been found to be especially useful, for example, in telecommunications and in medical diagnostics, in pharmaceutical research and chemical process monitoring. Ultra high performance waveguides (including optical fibers), for example, associated with high performance filters and precision micro optics are now being recognized as having the potential to fill a critical role in the ever increasing demand for increased bandwidth in telecommunications and to play a significant part in providing major improvements in medical diagnostics and pharmaceutical applications. Waveguides described herein are those used in propagating light typically in the 700-2000 nm range.

The invention further relates to a system having an identifying mechanism on or in high performance waveguides that is machine-readable (especially, by optical means, for example using a laser interference pattern) for quick and accurate recall of information included in the identifying mechanism. Many of the individual components of such optical assemblies are extremely small and technically complex. Differences between component assembly pieces or even differences within individual pieces are difficult to discern. Although the identifier in accordance with the present invention could be designed to serve a functional role in the operation or use of the waveguide, the identifier is distinct from the traditional functional aspects of the waveguide. The identifier avoids the need for detailed reanalysis of at least one specific waveguide technical characteristic included in the identifier. The identifier in some applications can be a simple mark that indicates the orientation needed in the assembly. For other applications it may be desirable to incorporate a substantial amount of information.

The etching or engraving, for example, of a cladding surface can provide precise and detailed product information, including: the manufacturer, the core and cladding dimensions, compositions, indices of refraction, any other imprinting that has been included, etc. In other cases additional details may be important. As indicated in Visionex patent application Ser. No. 08/819,979 filed Mar. 13, 1997, entitled "Method and Apparatus for Improved Fiber Optic Light Management," now U.S. Pat. No. 5,953,477, the optics associated with individual waveguides can have special characteristics. For example, the end face of one fiber may be intentionally angled so that its face is not uniformly perpendicular to its axis and the axis of a waveguide with which it is to be mated. It may be a very slight angle and it may be critical to have the end face precisely oriented as it mates with the waveguide. The identifier on the fiber and the waveguide provide sufficient information for the mating to be precise. One advantage of using the peripheral surface of a fiber end face is the relative space availability. The entire periphery could be utilized if information need and image clarity required. Similarly, the probability of that area causing fiber function limitations is low and could be reduced further, for example, by covering disrupted (etched/engraved) surface areas with material that would restore transparency to wavelengths negatively affected without detrimentally affecting the readability of the image. Such factors play a role in determining which identifier process, marking and location to utilize.

It also may be critical to high volume production for the information to be read significantly in advance of the mating operation and in some cases even by a different manufacturer. In one embodiment of the invention the automated system, for example, uses pre-aligned/oriented fiber segments locked into position by a belt or cartridge. The belt or cartridge is fed at the mating location for placement of fiber segments in predetermined alignment/orientation. (see FIG. 20a.) This manufacturing flow allows operations to be maintained at a rate that is not limited by the alignment function. It also allows for efficient task separations. In many cases it is desirable for each fiber segment end to have its own identifier. With longer segments it is advantageous to include some of the information at intervals along the segment. In such cases that the interval identifier would include distinguishing characteristic(s) to avoid confusion with end face identifications. The choice of location of and type of identifier depends on the specific application as indicated below. In some cases it may be desirable to have identical identifier markings in more than one location. For example, in assemblies in which there will be face-to-face connection of two optical fiber segments, it may be desirable to include the identifiers on both the face periphery and the fiber wall periphery near the edge. The fiber wall peripheral markings would be readable even after face-to-face connection. This would be beneficial for both repair and quality assurance.

Several embodiments of the identifier means are illustrated in FIG. 19 in which fiber 11$y$ has a core 11$ya$ and cladding 11$yb$. Fiber end face 13$y$, which could include an integral filter has included in its peripheral area (near edge 17$y$ which is the junction of end face 13$y$ and fiber wall 19$y$) identifier space 15$ya$. Identifier 15$ya$ can be simply a registration mark or can include more detailed information about the fiber. End face 13$y$ also includes in its peripheral area optional or alternative registration marks 15$yc$ that can be used in assuring, for example, proper rotation of fiber 11$y$ in an assembly operation. It is preferable to locate the identifier in the cladding area that is not in the substantive evanescent field of propagating light, i.e. outside the mode field diameter. In a preferred embodiment the identifier is in spaces in the cladding periphery, at least in about the exterior 80 percent, advantageously in the exterior 50 percent, especially in the exterior 20% and, in some cases, ideally in the exterior 10% to avoid interfering with the photon transmission purposes of the waveguide segment. Fiber wall 19$y$ includes identifier space 15$yb$ which can contain the same information as space 15$ya$ or could contain different information.

As shown in perspective view in FIG. 20, the system also includes reading means 22$ya$, 22$yb$, and 22$yc$ for sufficient identification to initiate appropriate reaction. Advantageously the system includes means for reacting to the identifier information, process 24$y$, and desirably means, drive motor 23$yc$, for appropriate adjustment of the placement of the waveguide, for example in mating with another waveguide. Thus, for example, as illustrated in FIG. 20 a waveguide (fiber segment 21$y$) rests on a pair of precision rollers 26$y$ at least one of which is mounted for controlled rotation by drive motor 23$yc$. Drive motor 23$yc$ is mounted on circular platform 28$y$, which rotates in synchronized movement with assembly belt 29$y$. As fiber segment 21$y$ passes in the view area of camera 22$yc$, information from its identifier is read and passed on to processor 24$y$. Processor 24$y$ digests the identifier information and compares it with information as to, for example, the disposition of the segment about its axis. Segment 21$y$ is needed to be rotated axially for perfect alignment with its mating assembly member 25$y$. Information is then communicated from the processor to drive motor 23$yc$ to rotate the fiber by rotating the roller(s) 26$y$. Cameras 22$yb$ and 22$ya$ communicate through the processor with drive motors 23$yb$ and 23$ya$ respectively. Drive motor 23$yb$ is geared finer than 23$yc$ for more precise adjustment of fiber segment 21$y$, which motor 23$ya$ is geared even finer than motor 23$y$ to assure precise alignment. After fiber segment 21$y$ is joined in precise alignment with piece 25$y$ by, for example, fusing the fused pieces picked off for subsequent inspection, use, distribution, etc. FIG. 20$a$ illustrates in end view cutaway drive 23$ya$ having rollers 26$ya$ supporting fiber segment 21$ya$. By driving one or both rollers 26$ya$, drive 23$ya$ effectively adjusts the rotation of fiber segment 21$ya$.

If both the mating members in mating assemblies have identification information on their respective peripheral areas the match could be idealized by appropriate to the information. Waveguides having such identification in one or more locations as substantially permanent identification for the fiber segment another aspect of this invention. The use of the cladding, especially the cladding peripheral areas, as the location of the identifier information is an especially preferred embodiment of this invention. The use of such identifier for quality assurance is another preferred embodiment of the invention.

The identifier can be placed on each piece in a number of different ways on one or more surfaces of the waveguide. FIG. 21 illustrates in perspective view several options for placement or configuration of identifier spaces. Fiber 31$y$ with core 31$ya$ and cladding 31$yb$ has on its end face 33$y$ identifier spaces 35$ya$ and 35$yc$. In this embodiment different information is included in space 35$ya$ from that included in space 35$yc$. The information in space 35$ya$ could be, for example, coded information relating to the technology in the fiber, while the coded information in space 35yc could identify the manufacturer, plant location, manufacturing line, specific run, etc. Information identical to that included in 35ya and 35yc is included in spaces 35yb and 35ye respectively which are located on fiber wall 39y. The location of identifier space on the fiber side wall permits continuing identification after the segment is joined at its end face to another assembly piece. Information space 35yd is included to illustrate that a plurality of identifier spaces can be utilized when appropriate.

Figure 22:
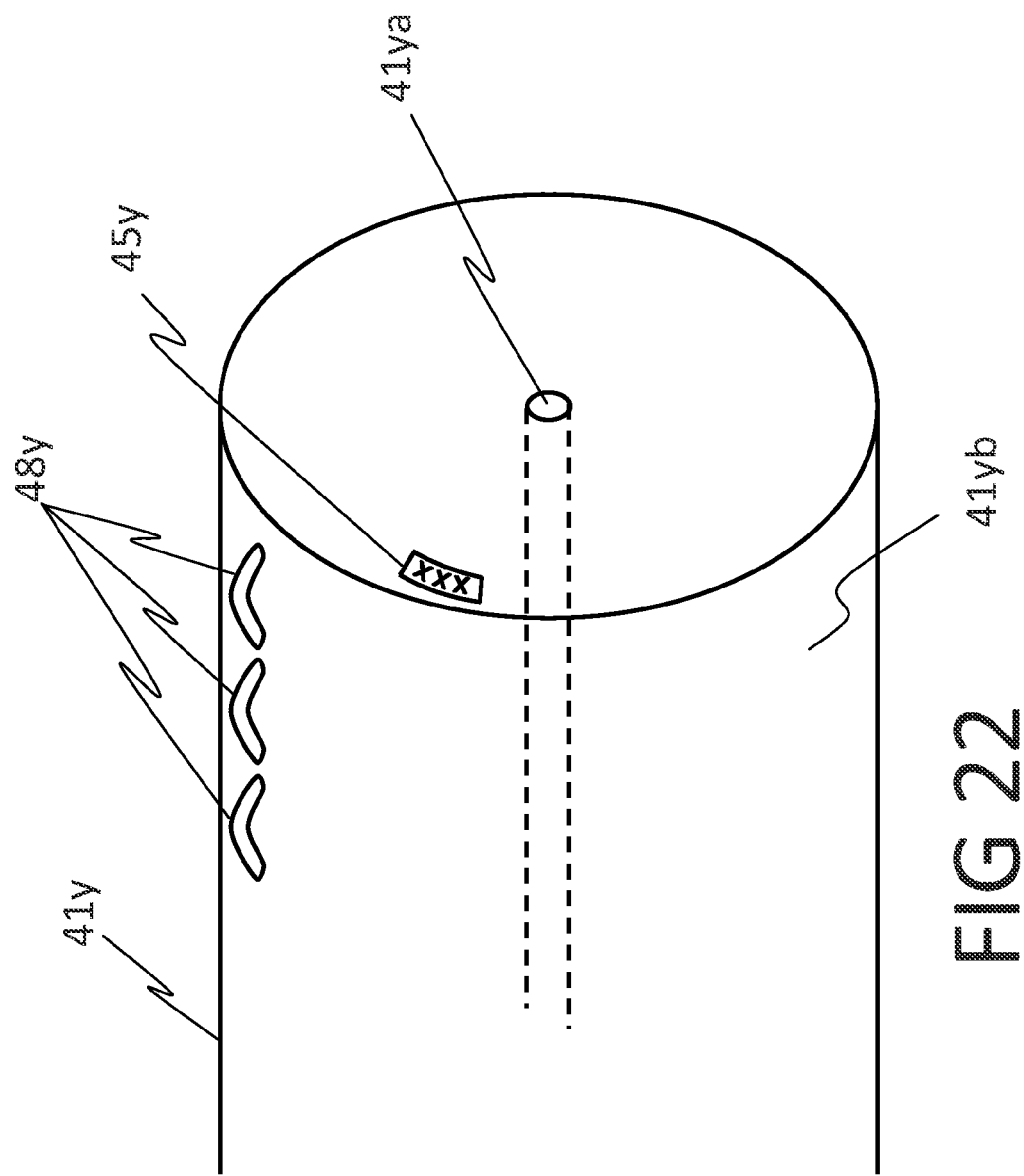
FIG. 22, from U.S. Patent Application No. 60/213,983, illustrates a fiber having a core and a cladding.

Identifier information can actually be imprinted in the cladding of an optical fiber, for example, by a technique similar to those used for fiber-Bragg gratings. Such gratings are normally applied to Ge-doped fiber core material as disclosed in U.S. Pat. Nos. 4,807,950 (950) and 4,725,110 (110). U.S. Pat. No. 5,235,639 discloses a method for "writing" an in line grating with high-silica glass. Although that technique could be rather expensive it does have some appeal. FIG. 22 illustrates fiber 41y having a core 41ya and cladding 41yb. Although fiber 41y has an identifier space 45y and information thereon, it also has a series of precisely located disruptions 48y in the index of refraction of peripheral cladding interior. These disruptions 48y are induced in a manner generally consistent with the disclosure, for example, in the above referenced 950 and 110 patents as modified in the '639 patent. However, instead of focusing the actinic radiation in the fiber core the radiation is focused in the cladding. Using the cladding to locate an information repository is another important embodiment of this invention. It is preferable to locate the disruptions in the cladding periphery, at least in about the exterior 80 percent, desirably in the exterior 50 percent, especially in the exterior 20% and preferably in the exterior 10% to avoid interfering with the photon transmission purposes of the waveguide segment.

Figure 23:
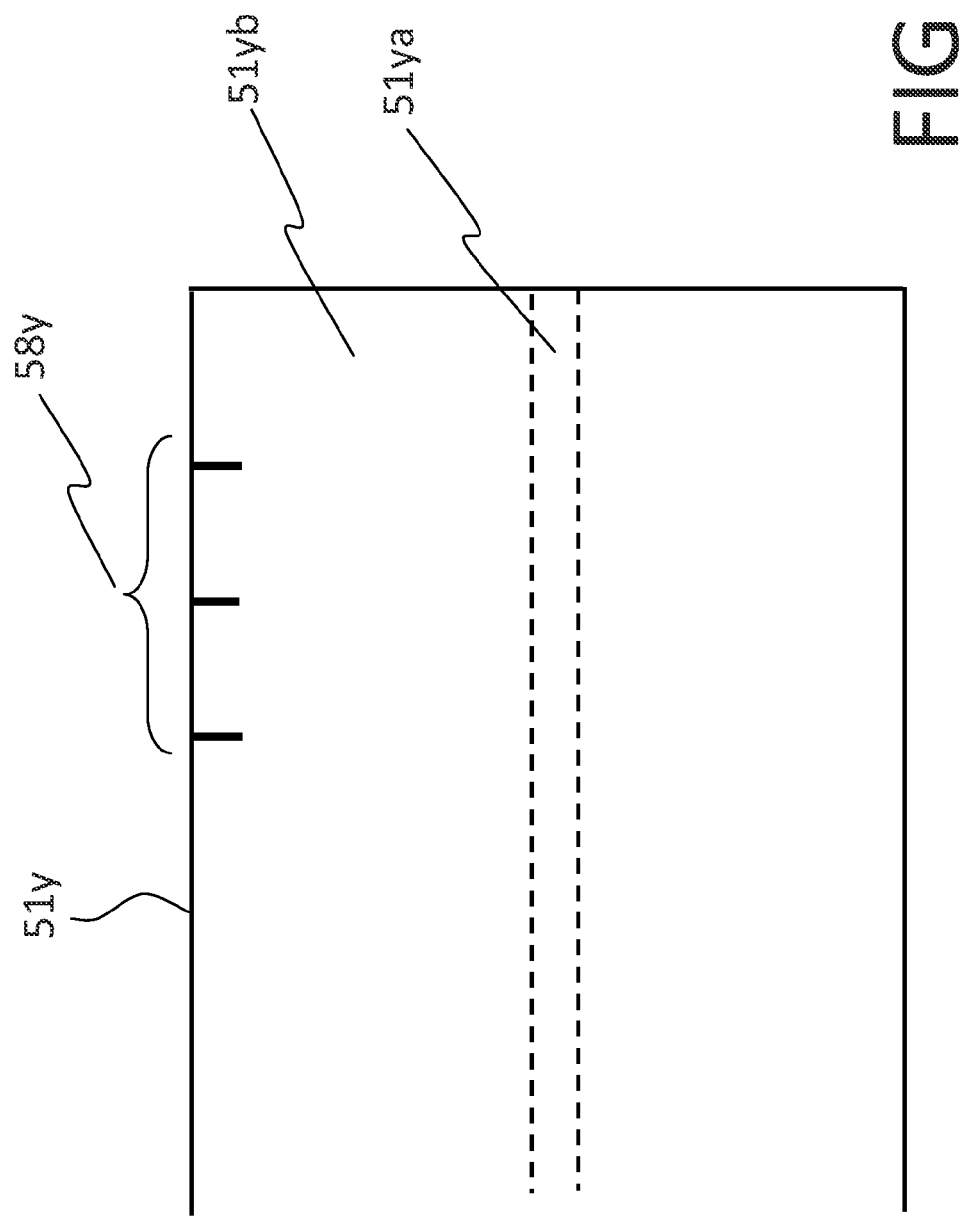
FIG. 23, from U.S. Patent Application No. 60/213,983, illustrates purposefully created index of refraction disruptions in cladding of a fiber.

FIG. 23 further illustrates purposefully created index of refraction disruptions 58y in cladding 51yb of fiber 51y having core 51ya. Since such disruptions can be crafted to be wavelength specific, a large number of individual wavelengths translated into codes are readily readable. As with the case of the surface identification spaces, for example in FIG. 21, these sets of disruptions can be placed in different locations around the fiber periphery with each set, e.g., having a different wavelength selectivity. Thus, it would be possible to standardize a given wavelength or combinations of wavelengths as codes representing, e.g., specific fiber runs and/or product codes.

In a recent Visionex patent application entitled "Optical Assembly with High Performance Filter," filed May 25, 1999, (assigned U.S. Ser. No. 09/318,451) we disclosed but did not claim another aspect of this invention. That aspect is "identifier space 15" as disclosed in the following, a quote from the paragraph transcending pages 8 and 9 of that application:

"In a further preferred embodiment of this invention the mask serves as a significant component in facilitating mating with other waveguide structures. Space 15 is reserved for micro bar code, magnetic or other identification information that will assist in assuring appropriate alignment and mating of the optical assemblies. For example, the mask dimensions and characteristics could be identified. In addition the fiber's core and polarization axes can be identified with respect to the location of the identifier and the mask aperture location, configuration and dimensions. Also, the core dimension and location can be identified. When fiber to fiber connections are made, often testing and aligning can be a time consuming task. Proper information in the identifier space could minimize the testing burden. Using code in identifier space 15 to reference specific, detailed computer link information would allow for unlimited information about the optical assembly. The identifier information could be located at other locations on the mask, but the space is desirably located where it could be used in automating manufacturing systems. If the optical assembly is likely to be end to end connected to another assembly in which subsequent identification is useful, for example as illustrated in FIG. 6 and FIG. 7, an identifier on the edge can be used." (See FIG. 13 and FIG. 14 as attached hereto.)

The drawings in that application show several examples of such identifier spaces (FIG. 1, 15; FIG. 3, 35; FIG. 4, 45; FIG. 5, 55; and FIGS. 6, 65 and 65a—see FIG. 8, 15x; FIG. 10, 35x; FIG. 11, 45x; FIG. 12, 55x; and FIGS. 13, 65x and 65xa, as attached hereto).

Additionally language of the May 25, 1999 patent application mentioned above has relevance to describe how identification would be applied to, for example, peripheral areas of the fiber. See page 9 beginning in line 17: "By using photo-resist material and standard photoresist techniques (see, for example, the descriptions for temporary mask formation in U.S. Pat. No. 5,237,630 by Hogg et al.) a temporary mask is formed in surface areas of the preassembly filtered fiber . . . . The temporary mask photoresist material is applied uniformly over the entire filtered fiber end portion. The photoresist material is then exposed imagewise . . . ."

(The following is new information but continues the thought) . . . to provide the identifier information. The photoresist is removed (usually by solvent wash) from the appropriate surface in an image wise pattern of the identifier information. The identifier information is then provided, for example, to the surface, e.g. by etching, or electrolytic deposition. In the latter case, as the temporary mask is removed using a solvent wash (with a different solvent) any metallic deposition covering the temporary mask is also removed leaving only the durable metallic identifier information in a precise identifier image pattern. Because the identifier information must be precise and be robust it is important, especially in many deposition environments, to assure that the substrate filter/or fiber be thoroughly clean before applying mask material and identifier. For some applications, a preferred embodiment includes the creation of the identifier by using precision laser etching/engraving techniques.

In a preferred embodiment a narrow view would include:

A fiber optic segment having an end face, a peripheral end face surface and peripheral edge surface said segment including at least one machine readable identifier which is readable from at least one of said peripheral surfaces.

A broader view would include:

A waveguide including at least one machine readable identifier.

What is claimed is:
1. A method comprising:
   providing a fiber segment, operable to guide light longitudinally, comprising:
   a first end face;
   a second end face;
   a cylindrical surface extending lengthwise from the first end face to the second end face; and
   a volume defined by the first end face, the second end face, and the cylindrical surface, the volume comprising a series of disruptions in index of refraction;
   generating a laser interference pattern from the series of disruptions in index of refraction;
   reading the laser interference pattern through the cylindrical surface with a camera; and
   determining a code based on the read laser interference pattern.

2. A method comprising:
providing a segment of optical fiber comprising a first end face, a second end face, and a cylindrical surface extending from the first end face to the second end face;
forming refractive index disruptions within a volume defined by the first end face, the second end face, and the cylindrical surface in response to illuminating the segment of optical fiber with actinic radiation;
generating a laser interference pattern from the formed refractive index disruptions;
reading the laser interference pattern through the cylindrical surface with a camera; and
determining a code based on the read laser interference pattern,
wherein the volume comprises a core that extends between the first end face and the second end face and that is circumferentially surrounded by a cladding area, with the refractive index disruptions located in the cladding area outside a mode field diameter of the core.

3. A method comprising:
providing a segment comprising:
   a first face at a first end of the segment;
   a second face at a second end of the segment;
   an outer cylindrical surface extending from the first face to the second face;
   a cylindrical volume defined by the first face, the second face, and the outer cylindrical surface, the cylindrical volume comprising:
      a cylindrically shaped region disposed axially in the cylindrical volume and extending lengthwise between the first face and the second face;
      a second region disposed circumferentially about the cylindrically shaped region, extending laterally from the cylindrically shaped region to the outer cylindrical surface, and extending lengthwise from the first face to the second face; and
      silica doped to provide a refractive index differential between the cylindrically shaped region and the second region, the refractive index differential forming a totally internally reflective interface; and
providing refractive index disruptions within the cylindrical volume, the refractive index disruptions created by illuminating the segment with actinic radiation;
generating a laser interference pattern from the refractive index disruptions;
reading the laser interference pattern through the outer cylindrical surface with a camera; and
determining a code based on the read laser interference pattern.

\* \* \* \* \*